(12) United States Patent
Kawakami

(10) Patent No.: US 11,492,009 B2
(45) Date of Patent: Nov. 8, 2022

(54) VEHICLE CONTROL DEVICE

(71) Applicant: MITSUBISHI ELECTRIC CORPORATION, Chiyoda-ku (JP)

(72) Inventor: Daisuke Kawakami, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 80 days.

(21) Appl. No.: 16/606,327

(22) PCT Filed: Jun. 8, 2017

(86) PCT No.: PCT/JP2017/021371
§ 371 (c)(1),
(2) Date: Oct. 18, 2019

(87) PCT Pub. No.: WO2018/225225
PCT Pub. Date: Dec. 13, 2018

(65) Prior Publication Data
US 2020/0290641 A1 Sep. 17, 2020

(51) Int. Cl.
*B60W 60/00* (2020.01)
*B60W 50/14* (2020.01)
(Continued)

(52) U.S. Cl.
CPC ........ *B60W 60/0016* (2020.02); *B60W 50/14* (2013.01); *B60W 60/0025* (2020.02); *G01C 21/3407* (2013.01); *G01C 21/3691* (2013.01)

(58) Field of Classification Search
CPC ......... B60W 60/0016; B60W 60/0025; B60W 50/14; B60W 60/0053; B60W 60/00186;
(Continued)

(56) References Cited

U.S. PATENT DOCUMENTS 10,029,701 B2 * 7/2018 Gordon ................. B60W 40/10
2001/0027537 A1 10/2001 Nada et al.
(Continued)

FOREIGN PATENT DOCUMENTS

JP 11-53207 A 2/1999
JP 2000-318544 A 11/2000
(Continued)

OTHER PUBLICATIONS

International Search Report dated Sep. 12, 2017 in PCT/JP2017/021371 filed on Jun. 8, 2017.

*Primary Examiner* — James J Lee
*Assistant Examiner* — Alexander George Matta
(74) *Attorney, Agent, or Firm* — Xsensus LLP

(57) ABSTRACT

Provided is a vehicle control device configured to execute specific control while at the same time sequentially switching the specific control that defines an operation to be executed by each of a plurality of surrounding environment acquisition devices configured to acquire information on a surrounding environment of a vehicle, a recognition/determination ECU configured to generate a path on which the vehicle is to travel, and an integrated control ECU configured to control the vehicle based on the generated path along with an elapse of time since detection of an anomaly, when the anomaly is detected in any one of the plurality of surrounding environment acquisition devices, the recognition/determination ECU, and the integrated control ECU.

17 Claims, 21 Drawing Sheets

| ABNORMAL COMPONENT | PROCESSING AT TIME OF DETECTION OF ABNORMALITY | PROCESSING OF SPECIFIC CONTROL (1) | PROCESSING OF SPECIFIC CONTROL (2) | PROCESSING OF SPECIFIC CONTROL (3) |
|---|---|---|---|---|
| ABNORMALITY OF SURROUNDING ENVIRONMENT ACQUISITION DEVICE 20 (E.G., CAMERA) | ·DETERMINE t1, t2, and t3 ·TRANSITION TO SPECIFIC CONTROL (1) | ·EXECUTE REACTIVATION OF SURROUNDING ENVIRONMENT ACQUISITION DEVICE 20 ·RECOGNITION/DETERMINATION ECU 11 EXECUTES DEGRADED OPERATION THAT CAN BE EXECUTED WITHOUT USING RESULT OF SURROUNDING ENVIRONMENT ACQUISITION DEVICE 20 TO MAINTAIN FUNCTIONALITY | ·SIMILAR TO SPECIFIC CONTROL (1) | ·SURROUNDING ENVIRONMENT ACQUISITION DEVICE 20 STOPS ·RECOGNITION/DETERMINATION ECU 11 AND INTEGRATED CONTROL ECU 12 EXECUTE DEGRADED OPERATION TO STOP VEHICLE |
| ABNORMALITY OF RECOGNITION/ DETERMINATION ECU 11 | ·DETERMINE t1, t2, and t3 ·TRANSITION TO SPECIFIC CONTROL (1) | ·RECOGNITION/DETERMINATION ECU 11 EXECUTES REACTIVATION ·INTEGRATED CONTROL ECU 12 PERFORMS CONTROL WITHOUT USING NEW PATH INFORMATION FROM RECOGNITION/DETERMINATION ECU 11 | ·RECOGNITION/DETERMINATION ECU 11 STOPS ·INTEGRATED CONTROL ECU 12 PERFORMS OPERATION OF MAINTAINING STATE OF VEHICLE AS MUCH AS POSSIBLE | ·RECOGNITION/DETERMINATION ECU 11 STOPS ·INTEGRATED CONTROL ECU 12 STOPS VEHICLE |
| ABNORMALITY OF INTEGRATED CONTROL ECU 12 | ·DETERMINE t1, t2, and t3 ·TRANSITION TO SPECIFIC CONTROL (1) | ·IMMEDIATELY TRANSITION TO SPECIFIC CONTROL (2) | ·IMMEDIATELY TRANSITION TO SPECIFIC CONTROL (3) | STOP VEHICLE |

(51) Int. Cl.
*G01C 21/34* (2006.01)
*G01C 21/36* (2006.01)

(58) Field of Classification Search
CPC ........ B60W 2050/0292; B60W 50/029; G01C 21/3407; G01C 21/3691
See application file for complete search history.

(56) References Cited

U.S. PATENT DOCUMENTS

| | | | | |
|---|---|---|---|---|
| 2005/0273264 | A1* | 12/2005 | Gern | B60W 50/14 701/301 |
| 2007/0188150 | A1* | 8/2007 | Yamaguchi | H02J 7/0029 320/136 |
| 2008/0074247 | A1* | 3/2008 | Plantamura | B60W 50/14 340/438 |
| 2012/0265359 | A1* | 10/2012 | Das | H04L 12/40032 700/292 |
| 2012/0265418 | A1* | 10/2012 | Foerster | G08G 1/166 701/70 |
| 2015/0142244 | A1* | 5/2015 | You | B60W 60/0053 701/23 |
| 2017/0153644 | A1* | 6/2017 | Otsuka | B60W 50/14 |
| 2018/0111628 | A1* | 4/2018 | Tamagaki | B60W 30/16 |
| 2018/0194364 | A1* | 7/2018 | Asakura | B60W 50/0205 |
| 2018/0281788 | A1* | 10/2018 | Uchida | B60W 50/00 |
| 2019/0056732 | A1* | 2/2019 | Aoi | B60W 50/14 |
| 2021/0146953 | A1* | 5/2021 | Horita | G08G 1/167 |

FOREIGN PATENT DOCUMENTS

| | | |
|---|---|---|
| JP | 2001-282302 A | 10/2001 |
| JP | 2002-221075 A | 8/2002 |
| JP | 2004-114854 A | 4/2004 |
| JP | 2006-290168 A | 10/2006 |
| JP | 2016-196285 A | 11/2016 |
| WO | WO 2016/157883 A1 | 10/2016 |

* cited by examiner

FIG. 4

| ABNORMAL COMPONENT | PROCESSING AT TIME OF DETECTION OF ABNORMALITY | PROCESSING OF SPECIFIC CONTROL (1) | PROCESSING OF SPECIFIC CONTROL (2) | PROCESSING OF SPECIFIC CONTROL (3) |
|---|---|---|---|---|
| ABNORMALITY OF SURROUNDING ENVIRONMENT ACQUISITION DEVICE 20 (E.G., CAMERA) | • DETERMINE t1, t2, and t3<br>• TRANSITION TO SPECIFIC CONTROL (1) | • EXECUTE REACTIVATION OF SURROUNDING ENVIRONMENT ACQUISITION DEVICE 20<br>• RECOGNITION/DETERMINATION ECU 11 EXECUTES DEGRADED OPERATION THAT CAN BE EXECUTED WITHOUT USING RESULT OF SURROUNDING ENVIRONMENT ACQUISITION DEVICE 20 TO MAINTAIN FUNCTIONALITY | • SIMILAR TO SPECIFIC CONTROL (1) | • SURROUNDING ENVIRONMENT ACQUISITION DEVICE 20 STOPS<br>• RECOGNITION/DETERMINATION ECU 11 AND INTEGRATED CONTROL ECU 12 EXECUTE DEGRADED OPERATION TO STOP VEHICLE |
| ABNORMALITY OF RECOGNITION/DETERMINATION ECU 11 | • DETERMINE t1, t2, and t3<br>• TRANSITION TO SPECIFIC CONTROL (1) | • RECOGNITION/DETERMINATION ECU 11 EXECUTES REACTIVATION<br>• INTEGRATED CONTROL ECU 12 PERFORMS CONTROL WITHOUT USING NEW PATH INFORMATION FROM RECOGNITION/DETERMINATION ECU 11 | • RECOGNITION/DETERMINATION ECU 11 STOPS<br>• INTEGRATED CONTROL ECU 12 PERFORMS OPERATION OF MAINTAINING STATE OF VEHICLE AS MUCH AS POSSIBLE | • RECOGNITION/DETERMINATION ECU 11 STOPS<br>• INTEGRATED CONTROL ECU 12 STOPS VEHICLE |
| ABNORMALITY OF INTEGRATED CONTROL ECU 12 | • DETERMINE t1, t2, and t3<br>• TRANSITION TO SPECIFIC CONTROL (1) | • IMMEDIATELY TRANSITION TO SPECIFIC CONTROL (2) | • IMMEDIATELY TRANSITION TO SPECIFIC CONTROL (3) | STOP VEHICLE |

FIG. 8

| DETAILS OF OPERATION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 |
|---|---|---|---|---|---|
| REACTIVATION1 | TURN ON POWER AGAIN | TURN ON POWER AGAIN | TURN ON POWER AGAIN | TURN ON POWER AGAIN | TURN ON POWER AGAIN |
| REACTIVATION2 | RESET | RESET | RESET | RESET | RESET |
| REACTIVATION3 | - | - | INITIALIZE COMMUNICATION | INITIALIZE MEMORY | INITIALIZE MEMORY |
| DEGRADED OPERATION1 | DECREASE PERIOD OF ACQUIRING IMAGE | DECREASE PERIOD OF ACQUIRING IMAGE | DECREASE COMMUNICATION PERIOD | DECREASE CONTROL PERIOD | DECREASE CONTROL PERIOD |
| DEGRADED OPERATION2 | - | - | - | GENERATE PATH WITHOUT CAMERA | EXECUTE LOW-LEVEL OPERATION (ONLY LANE KEEPING) |
| DEGRADED OPERATION3 | - | - | - | GENERATE PATH WITHOUT MILLIMETER-WAVE RADAR | DECREASE SPEED TO STOP |
| DEGRADED OPERATION4 | - | - | - | GENERATE PATH WITHOUT ROAD-TO-VEHICLE COMMUNICATION MODULE | STOP OPERATION |
| DEGRADED OPERATION5 | - | - | - | GENERATE PATH FOR PARKING ON SHOULDER OF ROAD | - |
| DEGRADED OPERATION6 | - | - | - | GENERATE PATH FOR STOPPING AT CURRENT LOCATION | - |

FIG. 9A

· AT TIME OF ABNORMALITY IN SURROUNDING ENVIRONMENT ACQUISITION DEVICE 20

| TIME REGION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 |
|---|---|---|---|---|---|
| T1 | REACTIVATION1 | NORMAL OPERATION | NORMAL OPERATION | DEGRADED OPERATION2 | NORMAL OPERATION |
| T2 | REACTIVATION1 | NORMAL OPERATION | NORMAL OPERATION | DEGRADED OPERATION2 | NORMAL OPERATION |
| T3 | STOP | NORMAL OPERATION | NORMAL OPERATION | DEGRADED OPERATION5 | DEGRADED OPERATION4 |

FIG. 9B

· AT TIME OF ABNORMALITY IN RECOGNITION/DETERMINATION ECU 11

| TIME REGION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 |
|---|---|---|---|---|---|
| T1 | NORMAL OPERATION | NORMAL OPERATION | NORMAL OPERATION | REACTIVATION1 | DEGRADED OPERATION2 |
| T2 | NORMAL OPERATION | NORMAL OPERATION | NORMAL OPERATION | STOP | DEGRADED OPERATION3 |
| T3 | NORMAL OPERATION | NORMAL OPERATION | NORMAL OPERATION | STOP | DEGRADED OPERATION4 |

FIG. 10A

OPERATION TABLE

- DEFINITION OF OPERATION

| ID | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 |
|---|---|---|---|---|---|
| ... | | | | | |
| [b'0000 00 110 0000000] | REACTIVATION1 | NORMAL OPERATION | NORMAL OPERATION | DEGRADED OPERATION2 | NORMAL OPERATION |
| ... | | | | | |
| [b'0000 01 101 0000000] | REACTIVATION1 | NORMAL OPERATION | NORMAL OPERATION | DEGRADED OPERATION2 | NORMAL OPERATION |
| ... | | | | | |
| [b'0000 10 100 0000000] | STOP | NORMAL OPERATION | NORMAL OPERATION | DEGRADED OPERATION5 →STOP | DEGRADED OPERATION4 →STOP |
| ... | | | | | |

FIG. 10B

· SPECIFICS OF ID

| SPECIFICS OF TABLE ID | | | |
|---|---|---|---|
| ABNORMALITY TYPE | TIME REGION | MODE/SPEED | SURROUNDING ENVIRONMENT |
| 4BITS | 2BITS | 3BITS | 7BITS |

FIG. 10C

· ABNORMALITY TYPE

| ABNORMALITY TYPE | | | | | |
|---|---|---|---|---|---|
| RECOVERY OPERATION | ABNORMAL COMPONENT | | | | |
| | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 |
| YES | [b'0000] | [b'0001] | [b'0010] | [b'0100] | [b'0101] |
| NO (FAILED) | [b'1000] | [b'1001] | [b'1010] | [b'1100] | [b'1101] |

FIG. 10D

· TIME REGION

| TIME REGION | | |
|---|---|---|
| T1 | T2 | T3 |
| [b'00] | [b'01] | [b'10] |

FIG. 10E

· MODE/SPEED

| MODE/SPEED | | | | | | | |
|---|---|---|---|---|---|---|---|
| ORDINARY ROAD | | | | EXPRESSWAY | | | |
| ~0km/h | ~40km/h | ~60km/h | 60km/h~ | ~40km/h | ~80km/h | ~100km/h | 100km/h~ |
| [b'000] | [b'001] | [b'010] | [b'011] | [b'100] | [b'101] | [b'110] | [b'111] |

FIG. 10F

- SURROUNDING ENVIRONMENT

| | SURROUNDING ENVIRONMENT | | | | | | |
|---|---|---|---|---|---|---|---|
| | CONGESTION | RAIN | NIGHTTIME | LOW μ ROAD | WHITE LINE | OBSTACLE1 | OBSTACLE2 |
| NO | [b'0] | [b'0] | [b'0] | [b'0] | [b'0] | [b'0] | [b'0] |
| YES | [b'1] | [b'1] | [b'1] | [b'1] | [b'1] | [b'1] | [b'1] |

FIG. 11

| DETAILS OF OPERATION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 | ABNORMALITY DETECTION ECU 13 |
|---|---|---|---|---|---|---|
| REACTIVATION1 | TURN ON POWER AGAIN | TURN ON POWER AGAIN | TURN ON POWER AGAIN | TURN ON POWER AGAIN | TURN ON POWER AGAIN | TURN ON POWER AGAIN |
| REACTIVATION2 | RESET | RESET | RESET | RESET | RESET | RESET |
| REACTIVATION3 | - | - | INITIALIZE COMMUNICATION | INITIALIZE MEMORY | INITIALIZE MEMORY | INITIALIZE MEMORY |
| DEGRADED OPERATION1 | DECREASE PERIOD OF ACQUIRING IMAGE | DECREASE PERIOD OF ACQUIRING IMAGE | DECREASE COMMUNICATION PERIOD | DECREASE CONTROL PERIOD | DECREASE CONTROL PERIOD | - |
| DEGRADED OPERATION2 | - | - | - | GENERATE PATH WITHOUT CAMERA | EXECUTE LOW-LEVEL OPERATION (ONLY LANE KEEPING) | - |
| DEGRADED OPERATION3 | - | - | - | GENERATE PATH WITHOUT MILLIMETER-WAVE RADAR | DECREASE SPEED TO STOP | - |
| DEGRADED OPERATION4 | - | - | - | GENERATE PATH WITHOUT ROAD-TO-VEHICLE COMMUNICATION MODULE | STOP OPERATION | - |
| DEGRADED OPERATION5 | - | - | - | GENERATE PATH FOR PARKING ON SHOULDER OF ROAD | - | - |
| DEGRADED OPERATION6 | - | - | - | GENERATE PATH FOR STOPPING AT CURRENT LOCATION | - | - |
| ALTERNATIVE OPERATION1 | - | - | - | TAKE OVER OPERATION OF ABNORMALITY DETECTION ECU | TAKE OVER OPERATION OF ABNORMALITY DETECTION ECU | TAKE OVER OPERATION OF RECOGNITION/DETERMINATION ECU |
| ALTERNATIVE OPERATION2 | - | - | - | - | - | TAKE OVER OPERATION OF INTEGRATED CONTROL ECU |

FIG. 12A

· AT TIME OF ABNORMALITY IN ABNORMALITY DETECTION ECU 13

| TIME REGION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 | ABNORMALITY DETECTION ECU 13 |
|---|---|---|---|---|---|---|
| T1 | NORMAL OPERATION | NORMAL OPERATION | NORMAL OPERATION | NORMAL OPERATION | NORMAL OPERATION + ALTERNATIVE OPERATION1 | REACTIVATION1 |
| T2 | NORMAL OPERATION | NORMAL OPERATION | NORMAL OPERATION | NORMAL OPERATION | NORMAL OPERATION + ALTERNATIVE OPERATION1 | REACTIVATION2 |
| T3 | NORMAL OPERATION | NORMAL OPERATION | NORMAL OPERATION | DEGRADED OPERATION5→STOP | DEGRADED OPERATION4 →STOP | STOP |

FIG. 12B

· AT TIME OF ABNORMALITY IN RECOGNITION/DETERMINATION ECU 11

| TIME REGION | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 | ABNORMALITY DETECTION ECU 13 |
|---|---|---|---|---|---|---|
| T1 | NORMAL OPERATION | NORMAL OPERATION | NORMAL OPERATION | STOP | DEGRADED OPERATION2 | NORMAL OPERATION + ALTERNATIVE OPERATION1 |
| T2 | NORMAL OPERATION | NORMAL OPERATION | NORMAL OPERATION | STOP | DEGRADED OPERATION2 | NORMAL OPERATION + ALTERNATIVE OPERATION1 |
| T3 | NORMAL OPERATION | NORMAL OPERATION | NORMAL OPERATION | STOP | DEGRADED OPERATION4→STOP | NORMAL OPERATION + ALTERNATIVE OPERATION1 |

FIG. 13A

- DEFINITION OF OPERATION

OPERATION TABLE

| ID | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 | ABNORMALITY DETECTION ECU 13 |
|---|---|---|---|---|---|---|
| ... | | | | | | |
| [b'0110 00 110 0000000] | NORMAL OPERATION | NORMAL OPERATION | NORMAL OPERATION | NORMAL OPERATION | NORMAL OPERATION | REACTIVATION1 |
| ... | | | | | | |
| [b'0110 01 101 0000000] | NORMAL OPERATION | NORMAL OPERATION | NORMAL OPERATION | NORMAL OPERATION | NORMAL OPERATION + ALTERNATIVE OPERATION | REACTIVATION2 |
| ... | | | | | | |
| [b'0110 10 100 0000000] | NORMAL OPERATION | NORMAL OPERATION | NORMAL OPERATION | NORMAL OPERATION | NORMAL OPERATION + ALTERNATIVE OPERATION | STOP |
| ... | | | | | | |
| [b'1100 00 110 0000000] | NORMAL OPERATION | NORMAL OPERATION | NORMAL OPERATION | STOP | NORMAL OPERATION | NORMAL OPERATION |
| ... | | | | | | |
| [b'1100 01 101 0000000] | NORMAL OPERATION | NORMAL OPERATION | NORMAL OPERATION | STOP | DEGRADED OPERATION1 | NORMAL OPERATION + ALTERNATIVE OPERATION1 |
| ... | | | | | | |
| [b'1100 10 100 0000000] | NORMAL OPERATION | NORMAL OPERATION | NORMAL OPERATION | STOP | DEGRADED OPERATION3 | NORMAL OPERATION + ALTERNATIVE OPERATION1 |
| ... | | | | | | |

FIG. 13B

· SPECIFICS OF ID

| SPECIFICS OF TABLE ID | | | |
|---|---|---|---|
| ABNORMALITY TYPE | TIME REGION | MODE/SPEED | SURROUNDING ENVIRONMENT |
| 4BITS | 2BITS | 3BITS | 7BITS |

FIG. 13C

· ABNORMALITY TYPE

| ABNORMALITY TYPE | | | | | | |
|---|---|---|---|---|---|---|
| RECOVERY OPERATION | ABNORMAL COMPONENT | | | | | |
| | SURROUNDING ENVIRONMENT ACQUISITION DEVICE 20 (E.G., CAMERA) | SURROUNDING ENVIRONMENT ACQUISITION DEVICE 21 (E.G., MILLIMETER-WAVE RADAR) | SURROUNDING ENVIRONMENT ACQUISITION DEVICE 22 (E.G., ROAD-TO-VEHICLE COMMUNICATION MODULE) | RECOGNITION/ DETERMINATION ECU 11 | INTEGRATED CONTROL ECU 12 | ABNORMALITY DETECTION ECU 13 |
| YES | [b'0000] | [b'0001] | [b'0010] | [b'0100] | [b'0101] | [b'0110] |
| NO (FAILED) | [b'1000] | [b'1001] | [b'1010] | [b'1100] | [b'1101] | [b'1110] |

FIG. 13D

· TIME REGION

| TIME REGION | | |
|---|---|---|
| T1 | T2 | T3 |
| [b'00] | [b'01] | [b'10] |

FIG. 13E

· MODE/SPEED

| MODE/SPEED | | | | | | | |
|---|---|---|---|---|---|---|---|
| ORDINARY ROAD | | | | EXPRESSWAY | | | |
| ~0km/h | ~40km/h | ~60km/h | 60km/h~ | ~40km/h | ~80km/h | ~100km/h | 100km/h~ |
| [b'000] | [b'001] | [b'010] | [b'011] | [b'100] | [b'101] | [b'110] | [b'111] |

FIG. 13F

- SURROUNDING ENVIRONMENT

| | SURROUNDING ENVIRONMENT | | | | | | |
|---|---|---|---|---|---|---|---|
| | CONGESTION | RAIN | NIGHTTIME | LOW μ ROAD | WHITE LINE | OBSTACLE1 | OBSTACLE2 |
| NO | [b'0] | [b'0] | [b'0] | [b'0] | [b'0] | [b'0] | [b'0] |
| YES | [b'1] | [b'1] | [b'1] | [b'1] | [b'1] | [b'1] | [b'1] |

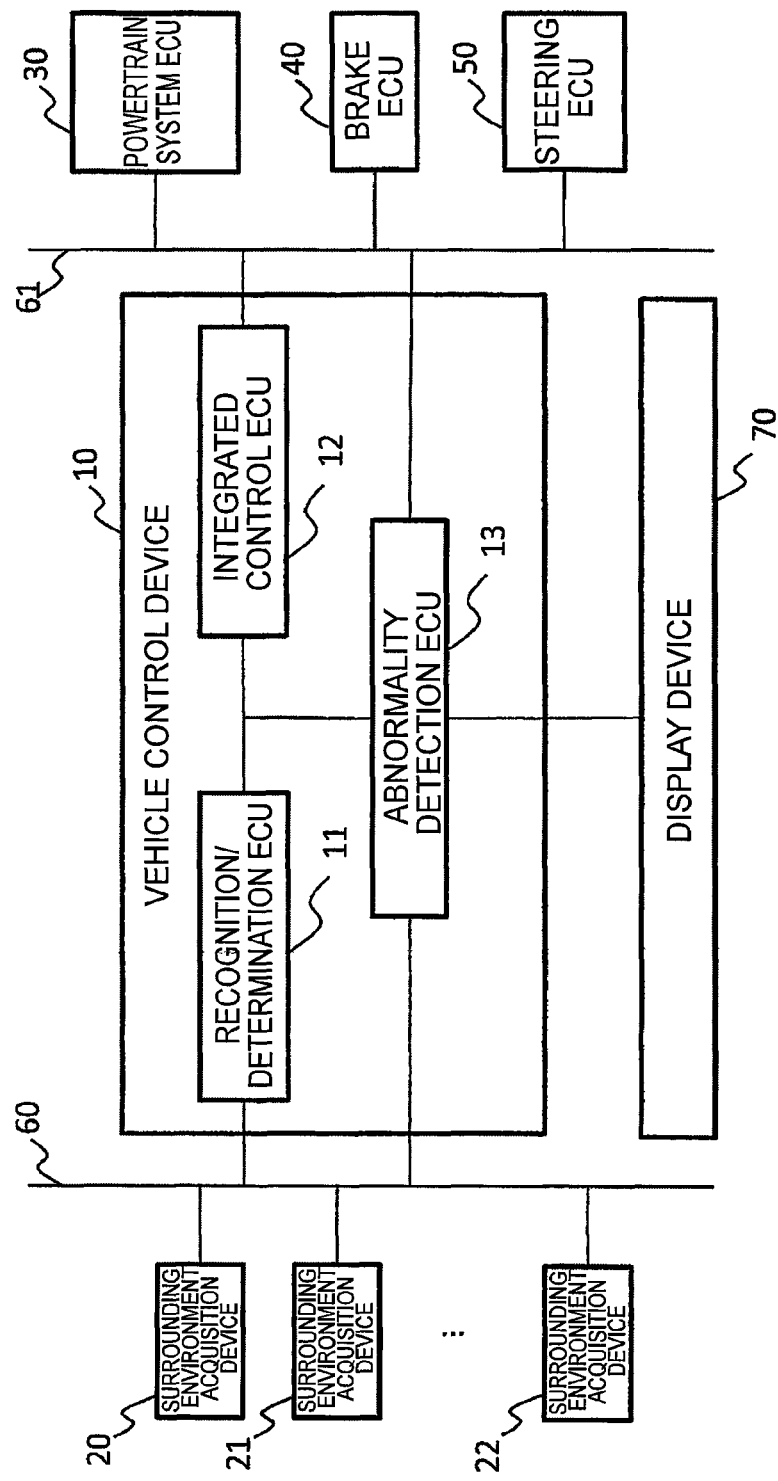

FIG. 15

| TIME REGION | DISPLAYED MESSAGE (EXAMPLE) | NOTIFICATION TYPE |
|---|---|---|
| T1 | ABNORMALITY OF "CAMERA" IS DETECTED | STATE NOTIFICATION |
| | "RECOVERING" NOW | OPERATION NOTIFICATION |
| | "TRANSITION TO DEGRADED OPERATION" AFTER "XXX" SECONDS IF RECOVERY FAILS | OPERATION ADVANCE NOTIFICATION |
| | PLEASE SWITCH TO MANUAL DRIVING AFTER TRANSITIONING TO DEGRADED OPERATION | ACTION ADVANCE NOTIFICATION |
| T2 | ABNORMALITY OF "CAMERA" IS DETECTED | STATE NOTIFICATION |
| | "RECOVERING" NOW AND "DRIVING BY DEGRADED OPERATION" | OPERATION NOTIFICATION |
| | PLEASE SWITCH TO MANUAL DRIVING | ACTION NOTIFICATION |
| | "TRANSITION TO STOP OPERATION" AFTER "XXX" SECONDS IF SWITCHING TO MANUAL DRIVING FAILS | ACTION ADVANCE NOTIFICATION |
| T3 | ABNORMALITY OF "CAMERA" IS DETECTED | STATE NOTIFICATION |
| | "VEHICLE IS STOPPING" NOW | OPERATION NOTIFICATION |
| | PLEASE SWITCH TO MANUAL DRIVING | ACTION NOTIFICATION |

VEHICLE CONTROL DEVICE

TECHNICAL FIELD

The present invention relates to a vehicle control device configured to control an electronic device mounted on a vehicle.

BACKGROUND ART

Various kinds of electronic devices are mounted in an in-vehicle system. The number of mounted vehicle control devices, which are called "electronic control units (ECUs)" for controlling those electronic devices, is increasing along with an increase in number of functions and complexity of the in-vehicle system in recent years. In particular, an autonomous driving system, which has recently been researched and developed more and more intensively, is generally a system having mounted thereon a plurality of high-performance CPUs.

In autonomous driving of a vehicle, when a failure has occurred in a part of the system, a fail-operational behavior is required to be implemented. Further, when it is difficult to implement a fail-operational behavior, functions other than the function that has failed are required to be used to implement a fail-safe with minimum required functions. As an example of related art for realizing a fail-operational behavior and a fail-safe, there is proposed a technique of maintaining functions by causing other ECUs to take over the operation of an ECU that has failed (refer to Patent Literature 1, for example).

CITATION LIST

Patent Literature

[PTL 1] JP 2006-290168 A

SUMMARY OF INVENTION

Technical Problem

The related art described in Patent Literature 1 is configured to determine a fail-safe operation based on a traveling state and a surrounding environment of the vehicle, but does not particularly consider a change in traveling state and surrounding environment of the vehicle during a fail-safe operation.

The present invention has been made in view of the above-mentioned circumstances, and has an object to obtain a vehicle control device configured to realize an appropriate fail-operational behavior depending on a situation that constantly changes at the time of occurrence of a failure of an electronic device mounted on a vehicle.

Solution to Problem

According to one embodiment of the present invention, there is provided a vehicle control device including: a recognition/determination ECU configured to generate a path on which a vehicle is to travel based on information on a surrounding environment of the vehicle, which is obtained from a plurality of surrounding environment acquisition devices each configured to acquire the information; an integrated control ECU configured to control the vehicle based on the path generated by the recognition/determination ECU; and an anomaly detection ECU configured to determine details of specific control that defines an operation to be executed by each of the plurality of surrounding environment acquisition devices, the recognition/determination ECU, and the integrated control ECU when an anomaly has occurred in any one of the plurality of surrounding environment acquisition devices, the recognition/determination ECU, and the integrated control ECU, wherein the anomaly detection ECU is configured to, when the anomaly is detected, execute the specific control while at the same time sequentially switching the specific control along with an elapse of a period of time since detection of the anomaly.

Advantageous Effects of Invention

According to the present invention, there is provided the configuration in which an appropriate operation is executed depending on a change in situation at the time of occurrence of an anomaly in an electronic device mounted on a vehicle to which a complex system like an autonomous driving system is applied. With this configuration, it is possible to obtain a vehicle control device configured to realize an appropriate fail-operational behavior depending on a situation that constantly changes at the time of occurrence of a failure of an electronic device mounted on a vehicle.

BRIEF DESCRIPTION OF DRAWINGS

FIG. 4 is a table for showing an example of processing of each of specific controls (1) to (3) to be executed when the anomaly detection ECU has detected an anomaly in the first embodiment of the present invention.

FIG. 8 is a table that defines details of a plurality of operations to be executed by each of a plurality of surrounding environment acquisition devices, a recognition/determination ECU, and an integrated control ECU in the first embodiment of the present invention.

FIG. 9A is a table for showing processing to be executed along with an elapse of time at a time of occurrence of an anomaly in the surrounding environment acquisition device in the first embodiment of the present invention.

FIG. 9B is a table for showing processing to be executed along with an elapse of time at a time of occurrence of an anomaly in the recognition/determination ECU in the first embodiment of the present invention.

FIG. 10A is a table for showing an operation table for determining details of an operation to be executed by each of the plurality of surrounding environment acquisition devices, the recognition/determination ECU, and the integrated control ECU in the first embodiment of the present invention.

FIG. 10B is a table for showing specifics of an ID of FIG. 10A.

FIG. 10C is a table for showing an ID of an anomaly type of FIG. 10B.

FIG. 10D is a table for showing an ID of a time region of FIG. 10B.

FIG. 10E is a table for showing an ID of a mode/speed of FIG. 10B.

FIG. 10F is a table for showing an ID of a surrounding environment of FIG. 10B.

FIG. 11 is a table that defines details of a plurality of operations to be executed by each of a plurality of surrounding environment acquisition devices, a recognition/determination ECU, an integrated control ECU, and an anomaly detection ECU in a second embodiment of the present invention.

FIG. 12A is a table for showing processing to be executed along with an elapse of time at a time of occurrence of an anomaly in the anomaly detection ECU in the second embodiment of the present invention.

FIG. 12B is a table for showing processing to be executed along with an elapse of time at a time of occurrence of an anomaly in the recognition/determination ECU in the second embodiment of the present invention.

FIG. 13A is a table for showing an operation table for determining details of an operation to be executed by each of the plurality of surrounding environment acquisition devices, the recognition/determination ECU, the integrated control ECU, and the anomaly detection ECU in the second embodiment of the present invention.

FIG. 13B is a table for showing specifics of an ID of FIG. 13A.

FIG. 13C is a table for showing an ID of an anomaly type of FIG. 13B.

FIG. 13D is a table for showing an ID of a time region of FIG. 13B.

FIG. 13E is a table for showing an ID of a mode/speed of FIG. 13B.

FIG. 13F is a table for showing an ID of a surrounding environment of FIG. 13B.

FIG. 14 is a configuration diagram for illustrating a vehicle control device according to a third embodiment of the present invention.

FIG. 15 is a table for showing details of a message to be displayed by a display device in the third embodiment of the present invention.

DESCRIPTION OF EMBODIMENTS

Now, vehicle control devices according to preferred embodiments of the present invention are described with reference to the accompanying drawings. In the illustration of the drawings, the same components or corresponding components are denoted by the same reference symbols, and the overlapping description thereof is herein omitted. Further, in each embodiment, a traveling state of a vehicle includes, for example, a type of a road on which the vehicle travels (e.g., expressway or ordinary road) and an operation status (e.g., speed of vehicle, "traveling straight ahead" status of vehicle, and "turning" status of vehicle) of the vehicle. A surrounding environment of the vehicle includes, for example, a road surface state, weather, and a degree of congestion of the road.

First Embodiment

Figure 1:
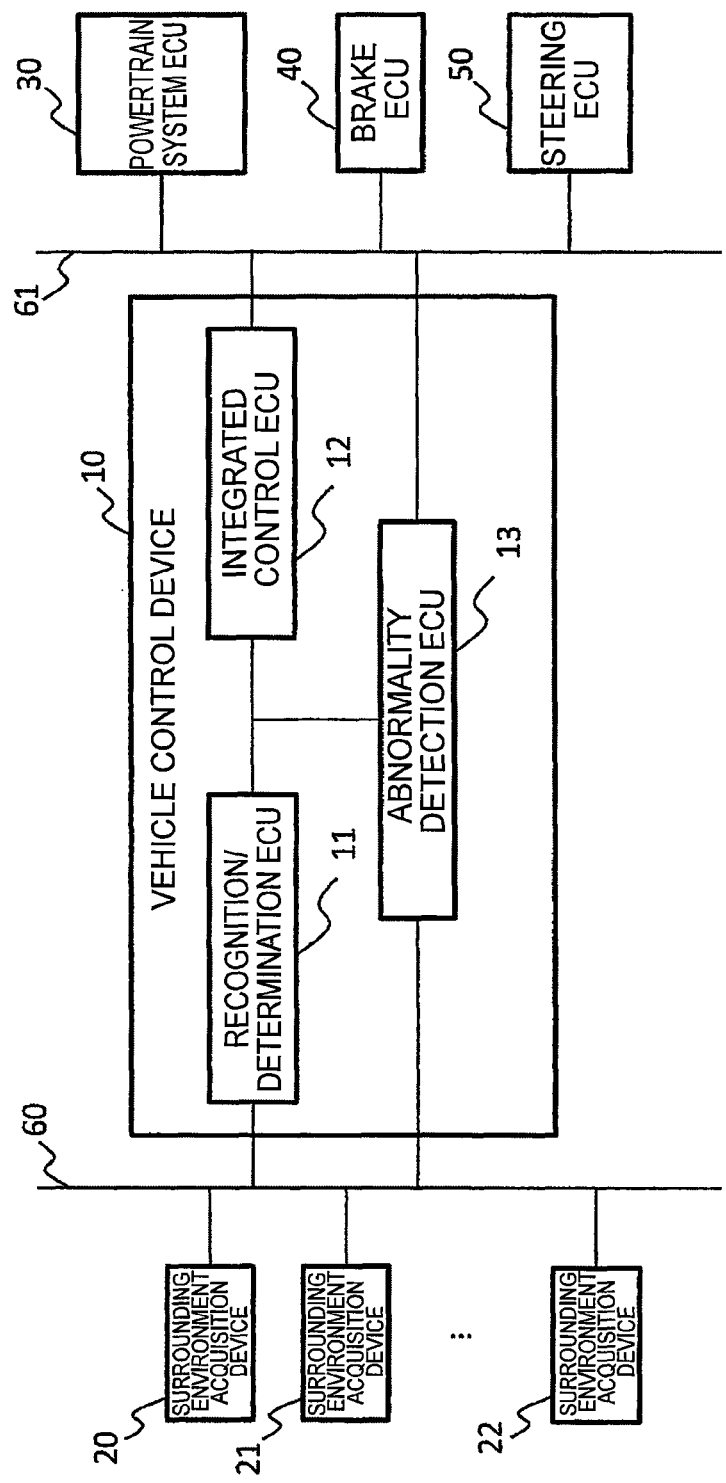
FIG. 1 is a configuration diagram for illustrating a vehicle control device according to a first embodiment of the present invention.

FIG. 1 is a configuration diagram for illustrating a vehicle control device 10 according to a first embodiment of the present invention. In FIG. 1, the vehicle control device 10 is mounted on a vehicle, and is communicably connected via a network 60 to a plurality of surrounding environment acquisition devices 20, 21, and 22 configured to acquire information on a surrounding environment of the vehicle. Further, the vehicle control device 10 is communicably connected via a network 61 to a powertrain system ECU 30 configured to control a powertrain system, a brake ECU 40 configured to control a brake, and a steering ECU 50 configured to control steering.

The vehicle control device 10 is achieved by implementing, for example, a microcomputer configured to execute arithmetic processing, a read only memory (ROM) configured to store data such as program data and fixed value data, and a random access memory (RAM), in which data stored therein is updated and sequentially rewritten.

The vehicle control device 10 is configured to calculate a control amount for controlling driving of the vehicle based on information acquired from each of the surrounding environment acquisition devices 20 to 22. The vehicle control device 10 transmits the calculated control amount to each of the powertrain system ECU 30, the brake ECU 40, and the steering ECU 50, to thereby implement autonomous driving of the vehicle.

In FIG. 1, the three surrounding environment acquisition devices 20 to 22 are illustrated, but the number of surrounding environment acquisition devices is not limited to three. Conceivable examples of the surrounding environment acquisition devices 20 to 22 include a camera, a millimeter-wave radar, a sonar and various kinds of sensors, a high-definition map, a GPS, an inter-vehicle communication module, and a road-to-vehicle communication module.

The vehicle control device 10 includes a recognition/determination ECU 11, an integrated control ECU 12, and an anomaly detection ECU 13.

The recognition/determination ECU 11 generates a path (namely, path in traveling direction of vehicle) on which the vehicle travels based on pieces of information acquired from the surrounding environment acquisition devices 20 to 22.

The recognition/determination ECU 11 executes a plurality of operations. The plurality of operations implemented to be executed by the recognition/determination ECU 11 include, for example, an operation of calculating a path without using a part of the surrounding environment acquisition devices 20 to 22 and an operation of detecting a nearby vacant space and calculating a path for guiding the vehicle to the vacant space.

The integrated control ECU 12 controls the vehicle based on the path generated by the recognition/determination ECU 11. Specifically, the integrated control ECU 12 calculates a control amount based on the path generated by the recognition/determination ECU 11, and transmits the control amount to each of the powertrain system ECU 30, the brake ECU 40, and the steering ECU 50.

The integrated control ECU 12 executes a plurality of operations. The plurality of operations implemented to be executed by the integrated control ECU 12 include, for example, an operation of executing such control as to reduce a calculation amount to enable the vehicle to stop urgently.

The anomaly detection ECU 13 aggregates operation information on each of the surrounding environment acquisition devices 20 to 22, the recognition/determination ECU 11, the integrated control ECU 12, the powertrain system ECU 30, the brake ECU 40, and the steering ECU 50, to thereby determine whether or not an anomaly has occurred in those devices. When an anomaly is detected, the anomaly detection ECU 13 executes such a degraded operation as to stop a part of functions or restrict output in those devices based on the aggregated information, to thereby implement an optimum operation of the vehicle executable under a current situation.

The anomaly detection ECU 13 transmits an operation command to the recognition/determination ECU 11 and the integrated control ECU 12 as required when executing a degraded operation. Further, when the surrounding environment or the like has changed due to an elapse of time since detection of an anomaly, the anomaly detection ECU 13 transmits an operation command that depends on the elapsed time to the recognition/determination ECU 11 and the integrated control ECU 12, to thereby constantly implement an optimum operation of the vehicle.

For the sake of convenience of description, in FIG. 1, the recognition/determination ECU 11, the integrated control ECU 12, and the anomaly detection ECU 13 are separately illustrated, but those ECUs may be provided in a distributed manner or may be provided in an integrated manner.

Figure 2:
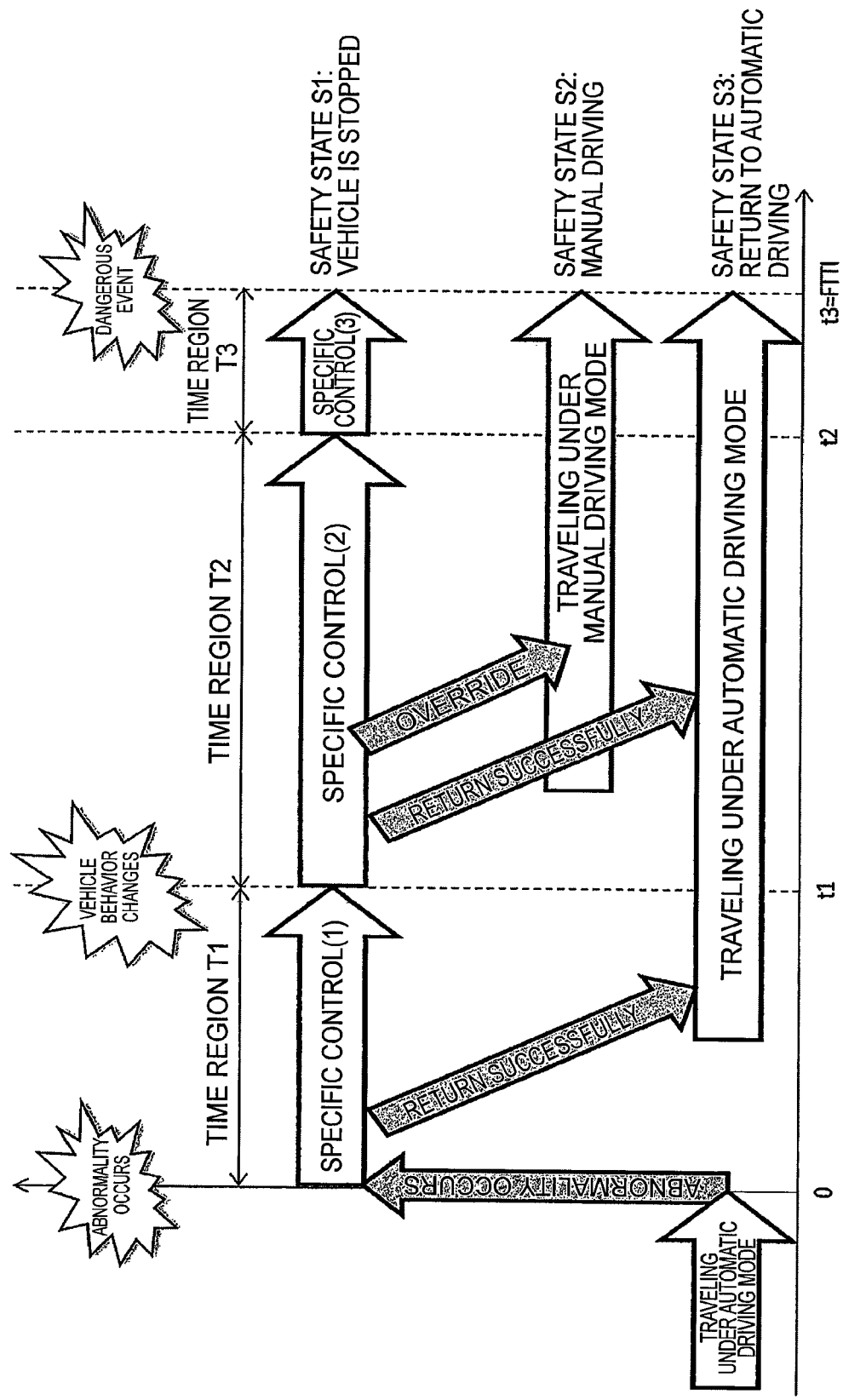
FIG. 2 is a timing chart for illustrating processing to be executed along with an elapse of time since an anomaly detection ECU has detected an anomaly in the first embodiment of the present invention.

Next, referring to FIG. 2, a description is given of specific control to be executed when the anomaly detection ECU 13 has detected an anomaly. FIG. 2 is a timing chart for illustrating processing to be executed along with an elapse of time since the anomaly detection ECU 13 has detected an anomaly in the first embodiment of the present invention.

When an anomaly has occurred during traveling under an autonomous driving mode and a time at which the anomaly detection ECU 13 has detected the anomaly is set as 0, a time t3 from occurrence of the anomaly until a time point at which a hazardous event (e.g., an event that causes damage to the vehicle or a vehicle occupant, such as the vehicle colliding with a guardrail) is predicted to occur is referred to as "fault tolerant time interval (FTTI)".

The anomaly detection ECU 13 is required to set the vehicle in a safety state within a period of time from detection of the anomaly until the time t3 is reached.

In this case, the safety state of the vehicle is considered to be a safety state S1 indicating a state in which the vehicle is stopped, a safety state S2 indicating a state in which the vehicle is switched from the autonomous driving mode to a manual driving mode, or a safety state S3 indicating a state in which the anomaly is resolved and the vehicle returns to the autonomous driving mode.

Further, the time t3 from occurrence of the anomaly is considered to include a time t1 (first time period) from occurrence of the anomaly until a change in behavior of the vehicle occurs (the vehicle can no longer maintain the current traveling state), and a time t2 (second time period) from occurrence of the anomaly until the vehicle starts to be stopped before a hazardous event occurs. The time t2 is longer than the time t1.

A period from the time 0 to the time t1 is set as a time region T1, a period from the time t1 to the time t2 is set as a time region T2, and a period from the time t2 to the time t3 is set as a time region T3.

As illustrated in FIG. 2, when the anomaly detection ECU 13 has detected an anomaly during traveling of the vehicle under the autonomous driving mode, as a specific control (1), the anomaly detection ECU 13 maintains the autonomous driving mode while executing an operation of causing an anomaly component to recover to the normal state. During the time region T1, when the anomaly component has successfully recovered to the normal state, the state of the vehicle transitions to the safety state S3, and the vehicle control device 10 maintains the autonomous driving mode.

When a period of time elapsed since detection of an anomaly reaches the time t1, the behavior of the vehicle changes. Thus, when the elapsed period of time reaches the time t1, the anomaly detection ECU 13 switches from the specific control (1) to a specific control (2). As a result, the control transitions to the specific control (2) in the period T2. The anomaly detection ECU 13 tries to execute a recovery operation also in the period T2. When the anomaly component has successfully recovered to the normal state in the period T2, the state of the vehicle transitions to the safety state S3. Further, when the driver of the vehicle has stopped the autonomous driving mode and switched to the manual driving mode, the state of the vehicle transitions to the safety state S2.

In this manner, the time t1 until specific control is switched is set to a period of time from occurrence of an anomaly until a change in behavior of the vehicle occurs. Therefore, it is possible to prevent the function from being degraded excessively.

When, in the period T2, the anomaly component has not recovered successfully and the elapsed period of time reaches the time t2 without the autonomous driving mode being switched to the manual driving mode, the anomaly detection ECU 13 switches from the specific control (2) to a specific control (3), to thereby safely stop the vehicle. In this case, the vehicle stops and the state of the vehicle transitions to the safety state S1 in the period T3, that is, by the time when the elapsed period of time reaches the time t3.

In this manner, the time t2 until specific control is switched is set to a period of time from occurrence of an anomaly until the vehicle starts to stop before a hazardous event occurs. Thus, in the worst case, it is possible to stop the vehicle and maintain the safety state of the vehicle.

As described above, the anomaly detection ECU 13 is configured to appropriately change an operation to be executed by the vehicle within the period of time from occurrence of an anomaly until the state of the vehicle transitions to the safety state.

That is, the anomaly detection ECU 13 executes the specific control (1) (first specific control) when detecting an anomaly. Further, the anomaly detection ECU 13 switches to the specific control (2) (second specific control) when the elapsed period of time reaches the time t1. Further, the anomaly detection ECU 13 switches to the specific control (3) (third specific control) when the elapsed period of time reaches the time t2.

The times t1, t2, and t3 illustrated in FIG. 2 change depending on the surrounding environment. For example, when the vehicle is in the autonomous driving mode on an expressway, the time t3 is considered to be, for example, a period of time until the vehicle reaches the next interchange or service area from the current location, or when the vehicle is in the autonomous driving mode on an ordinary road, the time t3 is considered to be, for example, a period of time until the vehicle reaches the next intersection from the current location.

Further, when the anomaly component is the integrated control ECU 12, a change in behavior of the vehicle immediately occurs, and thus the time t1 is likely to be shorter.

Meanwhile, when the anomaly component is any one of the surrounding environment acquisition devices 20 to 22, the time t1 is a period of time from detection of an anomaly until the recognition/determination ECU 11 finishes generating a path and the integrated control ECU 12 finishes calculating a control amount, and thus the time t1 is likely to be longer than that of the case in which the anomaly component is the integrated control ECU 12.

In this manner, when the anomaly is detected, the anomaly detection ECU 13 determines the times t1 and t2 until the specific control is switched based on at least one of the anomaly type of the detected anomaly, the traveling state of the vehicle at the time of detection of the anomaly, or the surrounding environment of the vehicle at the time of detection of the anomaly. Thus, it is possible to determine the time t1 until the behavior of the vehicle changes and the time t2 until before a hazardous state occurs, and flexibly adjust a degraded operation executed until specific control is switched.

The time t1 is calculated based on, for example, an anomaly type, a control period of each of the surrounding environment acquisition devices 20 to 22, the recognition/determination ECU 11, and the integrated control ECU 12, and an effective time period of the generated path information.

For example, when an anomaly has occurred in the integrated control ECU 12, the time t1 is the control period of the integrated control ECU 12. Further, when an anomaly has occurred in the recognition/determination ECU 11, the time t1 is a sum of an effective time period (e.g., the effective time period is 5 seconds when path information equivalent to 5 seconds is generated) of path information generated immediately before occurrence of the anomaly and the control period of the integrated control ECU 12.

When an anomaly has occurred in the surrounding environment acquisition devices 20 to 22, the time t1 changes depending on in which type of surrounding environment acquisition device an anomaly has occurred. When the vehicle can be maintained to travel by using a normal surrounding environment acquisition device, the times t1 and t2 are the same value. On the other hand, when the vehicle cannot be maintained to travel even by using a normal surrounding environment acquisition device, the time t1 is a sum of the above-mentioned effective time period of path information and the control period of the integrated control ECU 12.

The time t3 is determined by calculating a period of time (e.g., a period of time until the vehicle reaches the next interchange from the current location) until before a hazardous event occurs based on information (e.g., image of camera and road-to-vehicle communication) from the normally operating surrounding environment acquisition device and on own vehicle speed information from the powertrain system ECU 30.

The time t2 is calculated by subtracting from the time t3 a period of time until the vehicle stops, which is calculated from a traveling condition in the time region T2. That is, the time t2 is calculated to be a period of time obtained by subtracting from the time t3 a period of time required for stopping the vehicle.

For the sake of convenience of description, in FIG. 2, the three safety states S1 to S3 are defined as the safety state of the vehicle, but the number of defined safety states is not limited to three, and other safety states may be defined. Further, in FIG. 2, the three time regions T1 to T3 are defined as the time region, but the number of defined time regions is not limited to three. Further, in FIG. 2, the three specific controls (1) to (3) are defined as specific control, but the number of defined specific controls is not limited to three.

In this manner, the anomaly detection ECU 13 determines details of specific control that defines an operation to be executed by each of the surrounding environment acquisition devices 20 to 22, the recognition/determination ECU 11, and the integrated control ECU 12 when an anomaly has occurred in any one of the surrounding environment acquisition devices 20 to 22, the recognition/determination ECU 11, and the integrated control ECU 12. Further, when the anomaly is detected, the anomaly detection ECU 13 executes the specific control while at the same time sequentially switching the specific control along with an elapse of time since detection of the anomaly.

Figure 3:
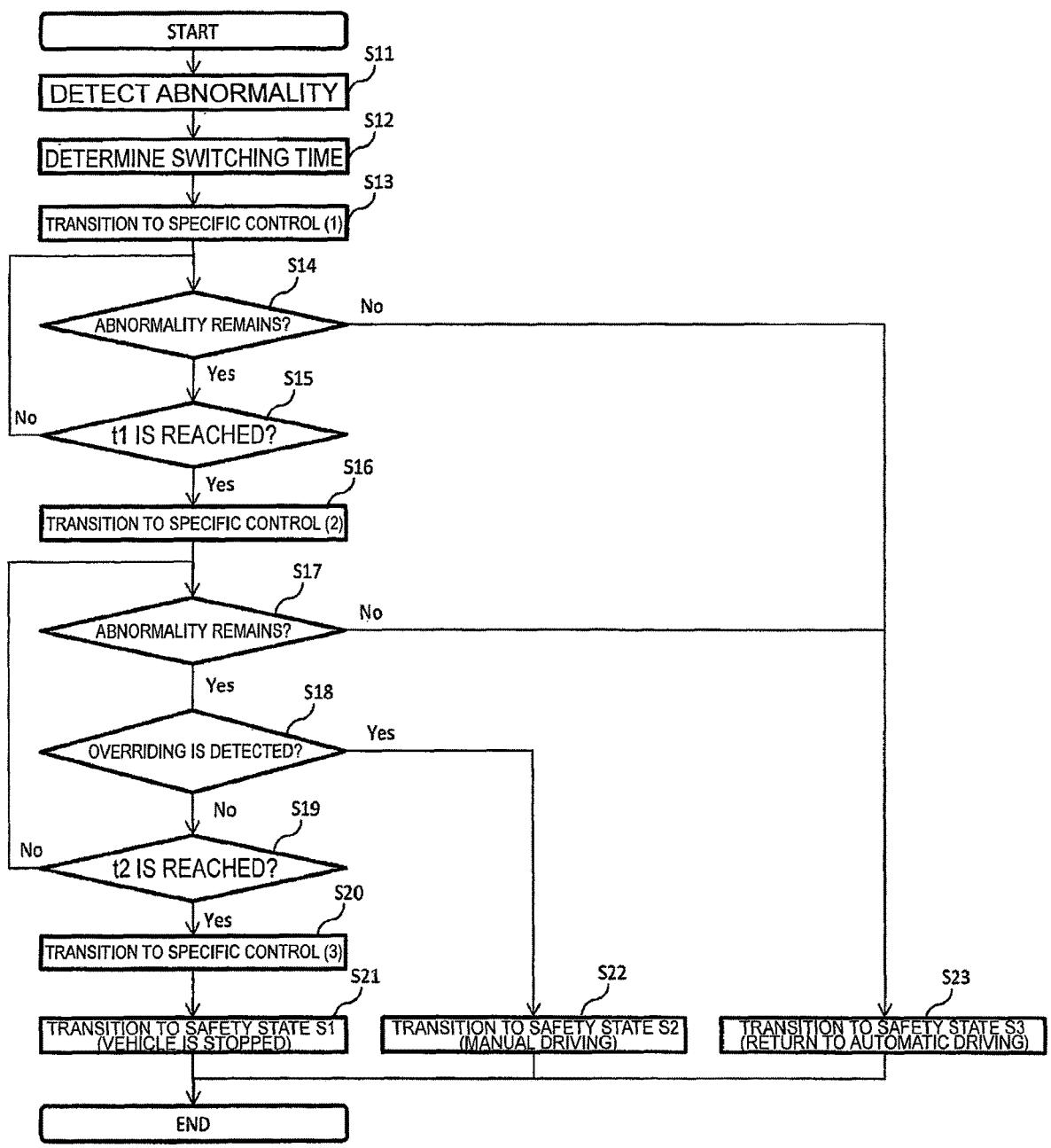
FIG. 3 is a flow chart for illustrating processing to be executed when the anomaly detection ECU has detected an anomaly in the first embodiment of the present invention.

Next, referring to FIG. 3, a description is further given of specific control to be executed when the anomaly detection ECU 13 has detected an anomaly. FIG. 3 is a flow chart for illustrating processing to be executed when the anomaly detection ECU 13 has detected an anomaly in the first embodiment of the present invention.

As illustrated in FIG. 3, when the anomaly detection ECU 13 has detected an anomaly (Step S11), the anomaly detection ECU 13 determines the values of the times t1, t2, and t3 as switching time determination processing for determining a period of time until which specific control is switched (Step S12).

When Step S12 is executed, the control transitions to the specific control (1) (Step S13). As the specific control (1), as described above, an operation of causing the anomaly component to recover is executed while the autonomous driving mode is maintained. When the anomaly component has successfully recovered in the period T1, the state of the vehicle transitions to the safety state S3, and the vehicle returns to the autonomous driving mode (Step S23).

In this manner, the anomaly detection ECU 13 determines details of the specific control (1) so that an operation (recovery operation) for causing the anomaly component to recover to the normal condition is executed. Thus, it is possible to return to the autonomous driving mode while maintaining the degraded operation. Therefore, it is possible to prevent the function from being degraded excessively.

Further, when the anomaly component has recovered to the normal condition, the anomaly detection ECU 13 stops the specific control (1). Thus, for example, when the anomaly component is a sensor, not only a failure of the sensor but also a performance limit of that sensor can be handled, and it is possible to return to the autonomous driving mode when the sensor has recovered from the performance limit of that sensor.

When the operation of causing the anomaly component to recover is executed but the anomaly remains (Step S14), and the period of time elapsed since detection of the anomaly reaches the time t1 (Step S15), the behavior of the vehicle changes. Thus, the control transitions to the specific control (2) (Step S16). When the anomaly component has successfully recovered in the period T2, the state of the vehicle transitions to the safety state S3, and the vehicle returns to the autonomous driving mode (Step S23).

In this manner, when the anomaly component has recovered to the normal condition, the anomaly detection ECU 13 stops the specific control (2).

When the operation of causing the anomaly component to recover is executed but the anomaly remains (Step S17), and the vehicle control device 10 has detected the fact that the driver has overridden driving (Step S18), the state of the vehicle transitions to the safety state S2 (Step S22).

In this manner, the anomaly detection ECU 13 stops the specific control (2) when overriding by the driver of the vehicle is detected. Therefore, it is possible to maintain the safety state of the vehicle through overriding by the driver.

When the anomaly remains (Step S17) and the elapsed period of time reaches the time t2 (Step S19) without detection of overriding (Step S18), the control transitions to the specific control (3) (Step S20). In this case, an operation of stopping the vehicle is executed, and thus the state of the vehicle transitions to the safety state S1 (Step S21).

In this manner, when the elapsed period of time reaches the time t2 but the anomaly component has not recovered to the normal state, the anomaly detection ECU 13 determines details of the specific control (3) so that an operation of starting to stop the vehicle is executed. Therefore, in the worst case, it is possible to stop the vehicle to maintain the safety state of the vehicle.

Next, a description is given of an example of details of the specific controls (1) to (3) with reference to FIG. 4. FIG. 4 is a table for showing an example of processing of each of the specific controls (1) to (3) to be executed when the anomaly detection ECU 13 has detected an anomaly in the first embodiment of the present invention. FIG. 4 is an illustration of details of processing to be executed at the time of occurrence of an anomaly in each of the surrounding environment acquisition device 20, the recognition/determination ECU 11, and the integrated control ECU 12 on the assumption that the surrounding environment acquisition device 20 is a camera.

When the anomaly component is the surrounding environment acquisition device 20, as the specific control (1), the surrounding environment acquisition device 20 is reactivated in accordance with an operation command from the anomaly detection ECU 13, and the recognition/determination ECU 11 executes a degraded operation that can be executed without using a result of acquisition by the surrounding environment acquisition device 20. As the specific control (2), processing similar to the specific control (1) is executed. As the specific control (3), the surrounding environment acquisition device 20 stops in accordance with an operation command from the anomaly detection ECU 13, and the recognition/determination ECU 11 and the integrated control ECU 12 execute a degraded operation for stopping the vehicle.

When the anomaly component is the recognition/determination ECU 11, as the specific control (1), the recognition/determination ECU 11 is reactivated in accordance with an operation command from the anomaly detection ECU 13, and the integrated control ECU 12 executes control without using new path information generated by the recognition/determination ECU 11. As the specific control (2), the recognition/determination ECU 11 stops in accordance with an operation command from the anomaly detection ECU 13, and the integrated control ECU 12 executes an operation of maintaining the state of the vehicle as much as possible. As the specific control (3), the integrated control ECU 12 stops the vehicle in accordance with an operation command from the anomaly detection ECU 13.

When the anomaly component is the integrated control ECU 12, the control immediately transitions to the specific control (3) without execution of any control as the specific controls (1) and (2), and the vehicle is stopped in accordance with an operation command from the anomaly detection ECU 13.

In this manner, appropriate specific control is executed based on the anomaly component and the period of time elapsed since detection of an anomaly, to thereby be able to execute the operation of maintaining the state of the vehicle or the recovery operation without excessively degrading the function of the system. The details of processing illustrated in FIG. 4 are only an example, and the details of processing to be executed may be changed.

Figure 5:
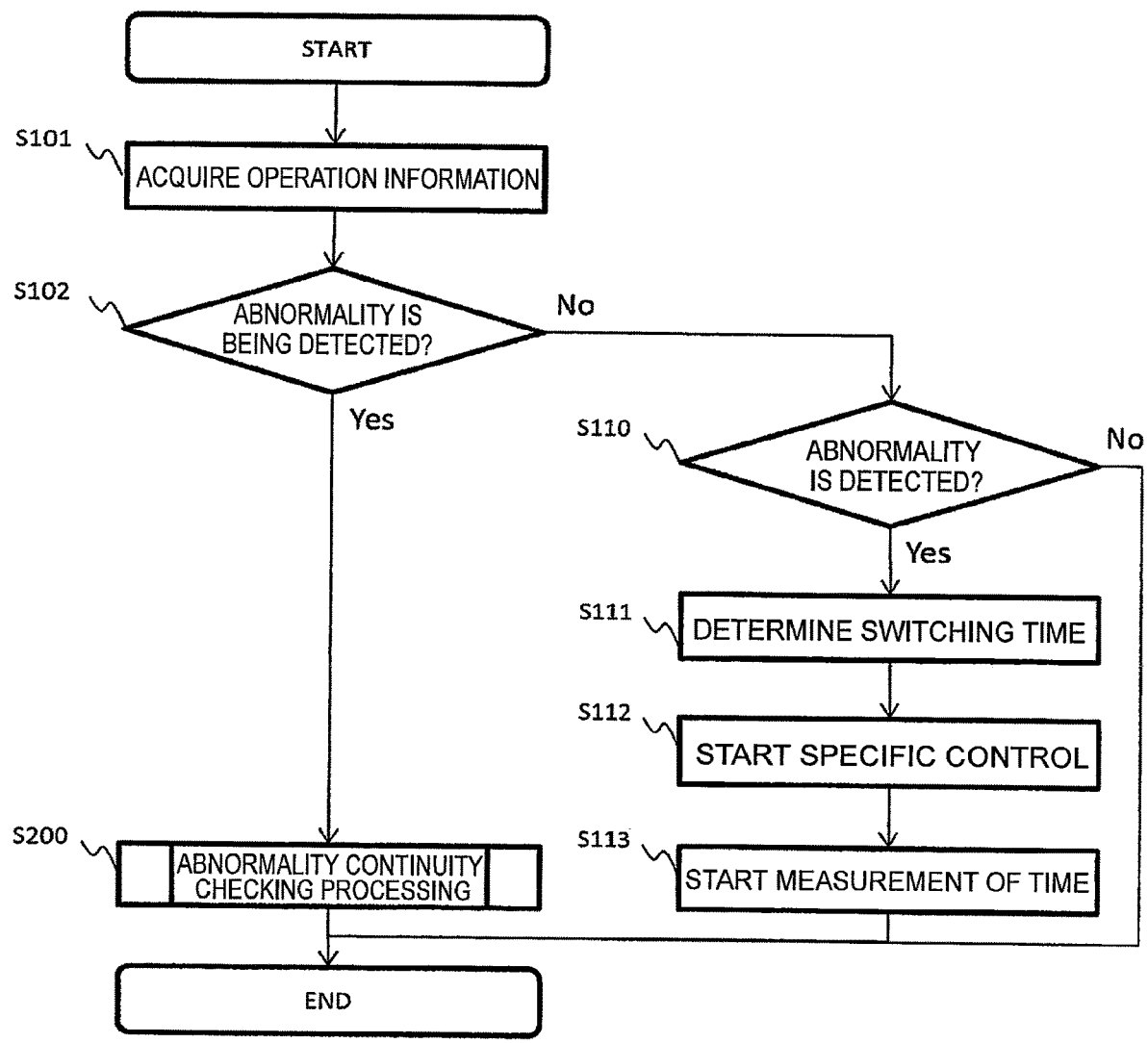
FIG. 5 is a flow chart for illustrating details of processing to be executed when the anomaly detection ECU has detected an anomaly in the first embodiment of the present invention.

Next, referring to FIG. 5, a description is given of details of an operation of the anomaly detection ECU 13 in a case where an anomaly has occurred. FIG. 5 is a flow chart for illustrating details of processing to be executed when the anomaly detection ECU 13 has detected an anomaly in the first embodiment of the present invention.

As described above, the anomaly detection ECU 13 determines whether or not an anomaly has occurred in the surrounding environment acquisition devices 20 to 22, the recognition/determination ECU 11, the integrated control ECU 12, the powertrain system ECU 30, the brake ECU 40, and the steering ECU 50 by aggregating operation information on each of those devices.

Specifically, the anomaly detection ECU 13 acquires the above-mentioned operation information (Step S101). Then, the anomaly detection ECU 13 determines whether or not an anomaly is being detected (Step S102). The anomaly detection ECU 13 executes anomaly continuity checking processing (Step S200) described later when an anomaly is being detected.

The anomaly detection ECU 13 checks whether or not there is an anomaly when an anomaly is not being detected (Step S110) When an anomaly is not detected, the anomaly detection ECU 13 ends the processing, whereas when an anomaly is detected, the anomaly detection ECU 13 determines the values of the times t1, t2, and t3 as the switching time determination processing (Step S111).

After the execution of the processing of Step S111, the anomaly detection ECU 13 starts specific control (Step S112), and starts to measure time to measure the period of time elapsed since detection of the anomaly (Step S113).

Figure 6:
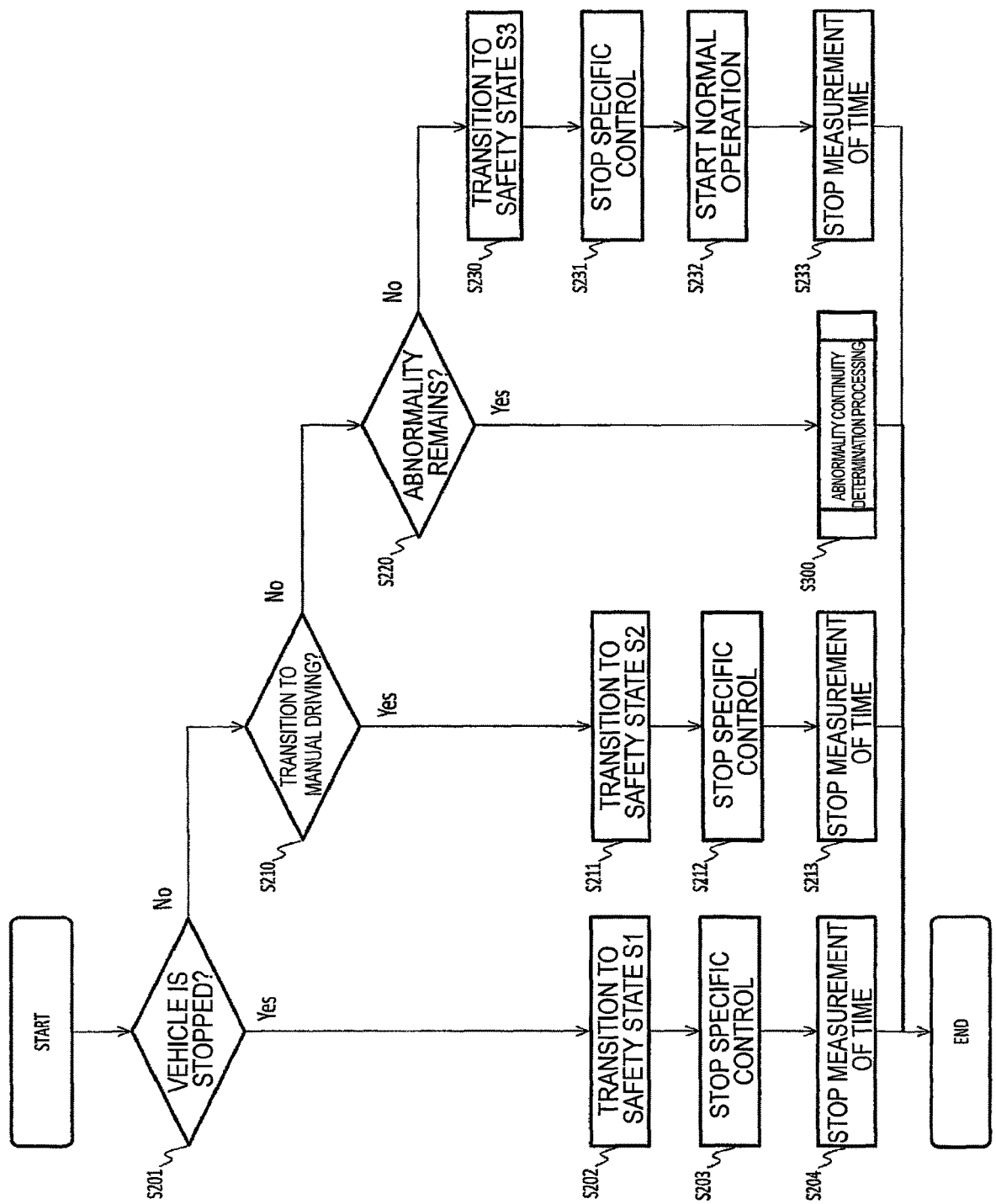
FIG. 6 is a flow chart for illustrating anomaly continuity checking processing of FIG. 5.

Next, a description is given of the anomaly continuity checking processing in Step S200 with reference to FIG. 6. FIG. 6 is a flow chart for illustrating the anomaly continuity checking processing of FIG. 5.

The anomaly detection ECU 13 checks whether or not the vehicle is stopped (Step S201). When the vehicle is stopped, the anomaly detection ECU 13 determines that the state of the vehicle has transitioned to the safety state S1 (Step S202). Further, the anomaly detection ECU 13 stops specific control (Step S203), and stops measurement of time (Step S204).

When the vehicle is not stopped, the anomaly detection ECU 13 checks whether or not the autonomous driving mode has transitioned to the manual driving mode (Step S210). When the mode has transitioned to the manual driving mode, the anomaly detection ECU 13 determines that the state of the vehicle has transitioned to the safety state S2 (Step S211). Further, the anomaly detection ECU 13 stops specific control (Step S212), and stops measurement of time (Step S213).

The anomaly detection ECU 13 checks whether or not the anomaly remains when the mode has not transitioned to the manual driving mode (Step S220). When the anomaly remains, the anomaly detection ECU 13 executes anomaly continuity determination processing (Step S300) described later.

When the anomaly does not remain, the anomaly detection ECU 13 determines that the state of the vehicle has transitioned to the safety state S3 (Step S230). Further, the anomaly detection ECU 13 stops specific control (Step S231), starts a normal operation, namely, an operation of returning to the autonomous driving mode (Step S232), and stops measurement of time (Step S233).

Figure 7:
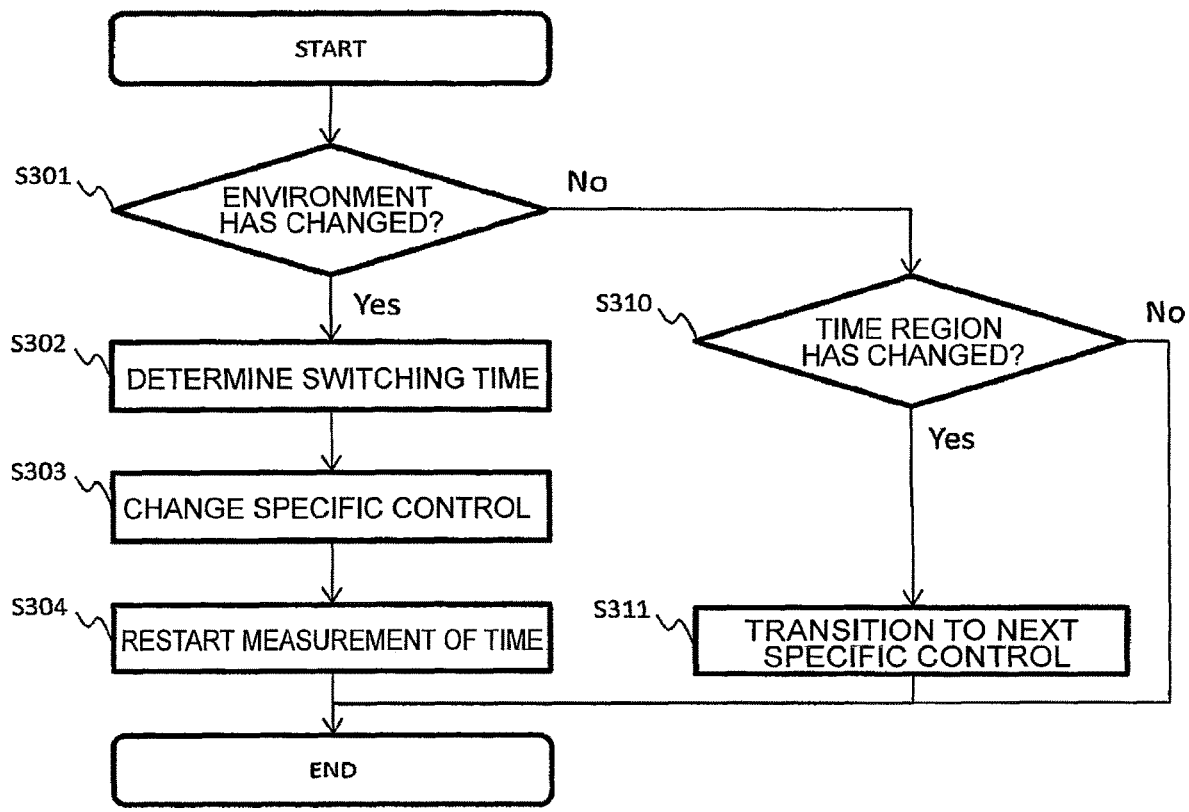
FIG. 7 is a flow chart for illustrating anomaly continuity determination processing of FIG. 5.

Next, a description is given of the anomaly continuity determination processing in Step S300 with reference to FIG. 7. FIG. 7 is a flow chart for illustrating the anomaly continuity determination processing of FIG. 5.

The anomaly detection ECU 13 checks whether or not there is a change in environment (Step S301). When there is a change in environment, the anomaly detection ECU 13 determines the values of the times t1, t2, and t3 again as the switching time determination processing (Step S302). Further, the anomaly detection ECU 13 changes specific control and starts the specific control after the change (Step S303), and restarts measurement of time (Step S304). The time (initial value) at which measurement of time is restarted may be changed depending on the changed environment. For example, when the elapsed period of time already falls within the time region T2, the time is set between the time t1 and the time t2.

When there is no change in environment, the anomaly detection ECU 13 checks whether or not the time region including the elapsed period of time has changed (Step S310). When the time region has changed, the anomaly detection ECU 13 transitions to next specific control (Step S311), whereas when the time region has not changed, the anomaly detection ECU 13 ends the processing.

Through the processing of the above-mentioned flow charts illustrated in FIG. 5 to FIG. 7, a degraded operation that depends on the period of time elapsed since detection of an anomaly is implemented.

Next, referring to FIG. 8, a description is given of a plurality of operations to be executed by each of the surrounding environment acquisition devices 20 to 22, the recognition/determination ECU 11, and the integrated control ECU 12 in accordance with specific control. FIG. 8 is a table that defines details of a plurality of operations to be executed by each of the plurality of surrounding environment acquisition devices 20 to 22, the recognition/determination ECU 11, and the integrated control ECU 12 in the first embodiment of the present invention.

In FIG. 8, it is assumed that the surrounding environment acquisition devices 20 to 22 are a camera, a millimeter-wave radar, and a road-to-vehicle communication module, respectively. Further, the details of operations illustrated in FIG. 8 are only one example, and are not limited to the operations illustrated in FIG. 8, and other operations may be defined.

As shown in FIG. 8, "turn on power again" and "reset operation" are defined as reactivations 1 and 2 to be executed by the surrounding environment acquisition device 20 (camera), respectively. Further, an operation of decreasing a period of acquiring an image is defined as a degraded operation 1 to be executed by the surrounding environment acquisition device 20.

"Turn on power again" and "reset operation" are defined as reactivations 1 and 2 to be executed by the surrounding environment acquisition device 21 (millimeter-wave radar), respectively. An operation of decreasing a period of acquiring an image is defined as a degraded operation 1 to be executed by the surrounding environment acquisition device 21.

"Turn on power again", "reset operation" and "communication initialization" are defined as reactivations 1 to 3 to be executed by the surrounding environment acquisition device 22 (road-to-vehicle communication module), respectively. An operation of decreasing a period of communication is defined as a degraded operation 1 to be executed by the surrounding environment acquisition device 22.

"Turn on power again", "reset operation", and "memory initialization" are defined as reactivations 1 to 3 to be executed by the recognition/determination ECU 11, respectively. The operation of decreasing a control period, an operation of generating a path without using the surrounding environment acquisition device 20 (camera), an operation of generating a path without using the surrounding environment acquisition device 21 (millimeter-wave radar), an operation of generating a path without using the surrounding environment acquisition device 22 (road-to-vehicle communication module), an operation of generating a path for parking on the shoulder of the road, and an operation of generating a path for stopping at the current location are defined as degraded operations 1 to 6 to be executed by the recognition/determination ECU 11, respectively.

"Turn on power again", "reset operation", and "memory initialization" are defined as reactivations 1 to 3 to be executed by the integrated control ECU 12, respectively. The operation of decreasing a control period, a low-level operation (operation of performing only lane keeping), an operation of decreasing a speed to stop, and a stop operation are defined as degraded operations 1 to 4 to be executed by the integrated control ECU 12, respectively.

Next, referring to FIG. 9A and FIG. 9B, a description is given of an example of specific control processing to be executed at a time of occurrence of an anomaly in each of the surrounding environment acquisition device 20 and the recognition/determination ECU 11. FIG. 9A is a table for showing processing to be executed along with an elapse of time at the time of occurrence of an anomaly in the surrounding environment acquisition device 20 in the first embodiment of the present invention. FIG. 9B is a table for showing processing to be executed along with an elapse of time at the time of occurrence of an anomaly in the recognition/determination ECU 11 in the first embodiment of the present invention.

In FIG. 9A, there is defined an operation to be executed by each of the surrounding environment acquisition devices 20 to 22, the recognition/determination ECU 11, and the integrated control ECU 12 at the time of occurrence of an anomaly in the surrounding environment acquisition device 20 (camera).

As shown in FIG. 9A, in the case where an anomaly has occurred in the surrounding environment acquisition device 20 (camera), when the elapsed period of time falls within the time region T1, the surrounding environment acquisition device 20 executes the reactivation 1. The recognition/determination ECU 11 executes the degraded operation 2, and the surrounding environment acquisition devices 21 and 22 and the integrated control ECU 12 continue a normal operation.

Also when the elapsed period of time falls within the time region T2, the surrounding environment acquisition devices 20 to 22, the recognition/determination ECU 11, and the integrated control ECU 12 execute the same operation as that described above. When the elapsed period of time falls within the time region T3, the surrounding environment acquisition devices 20 stops, and further, the recognition/determination ECU 11 executes the degraded operation 5 and the integrated control ECU 12 executes the degraded operation 4 to stop the vehicle.

In FIG. 9B, there is defined an operation to be executed by each of the surrounding environment acquisition devices 20 to 22, the recognition/determination ECU 11, and the integrated control ECU 12 at the time of occurrence of an anomaly in the recognition/determination ECU 11.

As shown in FIG. 9B, in the case where an anomaly has occurred in the recognition/determination ECU 11, when the elapsed period of time falls within the time region T1, the recognition/determination ECU 11 executes the reactivation 1. The integrated control ECU 12 executes the degraded operation 2, and the surrounding environment acquisition devices 20 to 22 continue a normal operation.

When the elapsed period of time falls within the time region T2, the recognition/determination ECU 11 stops, the integrated control ECU 12 executes the degraded operation 3, and the surrounding environment acquisition devices 20 to 22 continue a normal operation. When the elapsed period of time falls within the time region T3, the integrated control ECU 12 executes the degraded operation 4 and the surrounding environment acquisition devices 20 to 22 continue a normal operation.

Although the powertrain system ECU 30, the brake ECU 40, and the steering ECU 50 are not described in FIG. 8, FIG. 9A, and FIG. 9B, a degraded operation may be defined for each of those ECUs.

Next, referring to FIG. 10A to FIG. 10F, a description is given of an example of an operation table to be used by the anomaly detection ECU 13 to determine details of an operation to be executed by each of the surrounding environment acquisition devices 20 to 22, the recognition/determination ECU 11, and the integrated control ECU 12 at the time of occurrence of an anomaly.

FIG. 10A is a table for showing an operation table for determining the details of an operation to be executed by each of the plurality of surrounding environment acquisition devices 20 to 22, the recognition/determination ECU 11, and the integrated control ECU 12 in the first embodiment of the present invention. FIG. 10B is a table for showing specifics of an ID of FIG. 10A. FIG. 10C is a table for showing an ID of an anomaly type of FIG. 10B. FIG. 10D is a table for showing an ID of a time region of FIG. 10B. FIG. 10E is a table for showing an ID of a mode/speed of FIG. 10B. FIG. 10F is a table for showing an ID of a surrounding environment of FIG. 10B.

As shown in FIG. 10A, an operation to be executed by each of the surrounding environment acquisition devices 20 to 22, the recognition/determination ECU 11, and the integrated control ECU 12 is defined for each ID described later.

As shown in FIG. 10B, the ID of FIG. 10A is formed of 4 bits indicating information of "anomaly type", 2 bits indicating information of "time region", 3 bits indicating information of "mode/speed", and 7 bits indicating "surrounding environment". The specifics of an ID shown in FIG. 10B are only an example, and may include other elements. Further, the ID is not required to have 16 bits shown in FIG. 10B in a fixed manner.

As shown in FIG. 10C, the ID of "anomaly type" is determined based on the anomaly component, namely, information on in which of the surrounding environment acquisition devices 20 to 22, the recognition/determination ECU 11, and the integrated control ECU 12 an anomaly has occurred, and based on information on whether or not it is possible to execute an operation of recovering the anomaly component. In FIG. 10C, the powertrain system ECU 30, the brake ECU 40, and the steering ECU 50 are not described, but those ECUs may be added.

As shown in FIG. 10D, the ID of the time region is determined based on which of the time regions T1, T2, and T3 includes the elapsed period of time. As shown in FIG. 10E, the ID of the mode/speed is determined based on at which speed the vehicle is traveling on an ordinary road or an expressway. As shown in FIG. 10F, the ID of the surrounding environment is determined by the surrounding environment of the vehicle.

The mode out of the mode/speed shown in FIG. 10E is obtained by, for example, the surrounding environment acquisition device including a high-definition map and determining on which of an ordinary road or an expressway the own vehicle is traveling based on high-definition map information. The speed (namely, vehicle speed) out of the mode/speed shown in FIG. 10E is obtained from feedback of control information on the own vehicle.

The surrounding environment shown in FIG. 10F is acquired from the surrounding environment acquisition devices 20 to 22, or can be acquired from feedback of control information on the own vehicle. For example, when a congestion has occurred, such a degraded operation as to maintain an inter-vehicle distance to a vehicle in front of the own vehicle is executed. When the weather is rainy or in the nighttime, the possibility of decrease in ability to recognize an obstacle is considered, and such a degraded operation as to suppress the speed is executed. Control of the vehicle is difficult on a low p road, and thus such a degraded operation as to avoid an abrupt steering operation is executed. When a white line is not detected, a degraded operation based on information of the high-definition map is executed. When an obstacle is detected, control enabling the vehicle to avoid the obstacle is executed as a degraded operation.

With the above-mentioned ID, details of specific control to be executed in Step S112 of FIG. 5 when an anomaly is detected for the first time, details of specific control to be executed in Step S303 of FIG. 7 when the environment has changed during occurrence of the anomaly, and details of specific control to be executed in Step S311 of FIG. 7 when the time region has changed during occurrence of the anomaly are each determined.

The anomaly detection ECU 13 is configured to, when detecting an anomaly, use such an operation table as to determine an operation to be executed by each of the surrounding environment acquisition devices 20 to 22, the recognition/determination ECU 11, and the integrated control ECU 12. Thus, even when there are a variety of details of operations to be executed by those devices, this operation table can be used to uniquely determine an operation to be executed by each of those devices.

Further, with Step S230 to Step S233 of FIG. 6, an operation of returning a degraded operation to a normal operation can be implemented not only for an anomaly due to a failure but also for an anomaly of a temporary trouble due to the performance limit of a sensor.

In this manner, when the anomaly is detected, the anomaly detection ECU 13 determines details of the specific control based on at least one of the anomaly type of the detected anomaly, the traveling state of the vehicle at the time of detection of the anomaly, or the surrounding environment at the time of detection of the anomaly. Therefore, it is possible to implement an optimum degraded operation as a system in consideration of, for example, the traveling state of the vehicle and the surrounding environment of the vehicle.

Specifically, the anomaly detection ECU 13 determines details of the specific control by using an operation table in which the details of the specific control and at least one of the anomaly type, the mode/speed of the vehicle as the traveling state, or the surrounding environment are associated with each other. Therefore, even when there are a variety of executable degraded operations, the table can be used to determine what kind of operation is to be executed by each of the surrounding environment acquisition devices 20 to 22, the recognition/determination ECU 11, and the integrated control ECU 12.

As described above, the vehicle control device according to the first embodiment of the present invention is configured to, when an anomaly is detected, execute specific control in which an operation to be executed by each of the plurality of surrounding environment acquisition devices, the recognition/determination ECU, and the integrated control ECU along with an elapse of time since detection of the anomaly is defined, while at the same time sequentially switching the specific control.

With this configuration, it is possible to enable various kinds of electronic devices to execute an appropriate operation depending on a change in situation at the time of occurrence of an anomaly in an electronic device mounted on the vehicle, and as a result, implement an operation of maintaining the state of the vehicle without excessively degrading the function of the system. Further, it is possible to handle a degraded operation at the time of occurrence of an anomaly during traveling of the vehicle, cope with a change in environment during the degraded operation, and implement a fail-operational behavior. Further, a fail-operational system is implemented at the time of occurrence of a failure in a part of the functions, and thus it is possible to determine an optimum degraded operation as a system in consideration of the period of time elapsed since occurrence of an anomaly, the vehicle state, and the surrounding environment.

Second Embodiment

In a second embodiment of the present invention, a description is given of the vehicle control device 10 configured to handle not only anomalies of the surrounding environment acquisition devices 20 to 22, the recognition/determination ECU 11, and the integrated control ECU 12 but also an anomaly of the anomaly detection ECU 13 in addition to the configuration of the first embodiment. In the second embodiment, a description of points similar to those of the first embodiment is omitted, and a difference from the first embodiment is mainly described.

FIG. 11 is a table that defines details of a plurality of operations to be executed by each of the plurality of surrounding environment acquisition devices 20 to 22, the recognition/determination ECU 11, the integrated control ECU 12, and the anomaly detection ECU 13 in the second embodiment of the present invention.

The configuration of the vehicle control device 10 according to the second embodiment is similar to that of FIG. 1, but as shown in FIG. 11, the details of a plurality of operations to be executed at the time of occurrence of an anomaly are partially different from those of FIG. 8. That is, as the difference from FIG. 8, in FIG. 11, an operation to be executed by the anomaly detection ECU 13 at the time of detection of an anomaly is defined, and further, an alternative operation is defined in addition to reactivation and a degraded operation as operations to be executed by the recognition/determination ECU 11, the integrated control ECU 12, and the anomaly detection ECU 13.

As shown in FIG. 11, in addition to the operations shown in FIG. 8, an alternative operation 1 that takes over the function of the anomaly detection ECU 13 at the time of occurrence of an anomaly in the anomaly detection ECU 13 is defined as an operation to be executed by each of the recognition/determination ECU 11 and the integrated control ECU 12.

As an operation to be executed by the anomaly detection ECU 13, the reactivations 1 to 3, the alternative operation 1 that takes over the function of the recognition/determination ECU 11 at the time of occurrence of an anomaly in the recognition/determination ECU 11, and an alternative operation 2 that takes over the function of the integrated control ECU 12 at the time of occurrence of an anomaly in the integrated control ECU 12 are defined.

Next, referring to FIG. 12A and FIG. 12B, a description is given of an example of processing to be executed at the time of occurrence of an anomaly in each of the anomaly detection ECU 13 and the recognition/determination ECU 11. FIG. 12A is a table for showing processing to be executed along with an elapse of time at the time of occurrence of an anomaly in the anomaly detection ECU 13 in the second embodiment of the present invention. FIG. 12B is a table for showing processing to be executed along with an elapse of time at the time of occurrence of an anomaly in the recognition/determination ECU 11 in the second embodiment of the present invention.

As shown in FIG. 12A, when an anomaly has occurred in the anomaly detection ECU 13, the integrated control ECU 12 detects the anomaly of the anomaly detection ECU 13, and takes over the operation of the anomaly detection ECU 13. That is, when an anomaly has occurred in the anomaly detection ECU 13, the integrated control ECU 12 takes over the function of the anomaly detection ECU 13. When the elapsed period of time falls within the time region T1, the anomaly detection ECU 13 executes the reactivation 1. The surrounding environment acquisition devices 20 to 22 and the recognition/determination ECU 11 continue a normal operation. The integrated control ECU 12 executes the alternative operation 1 while at the same time continuing a normal operation, to thereby take over the operation of the anomaly detection ECU 13.

When the elapsed period of time falls within the time region T2, the anomaly detection ECU 13 executes the reactivation 2. The surrounding environment acquisition devices 20 to 22 and the recognition/determination ECU 11 continue a normal operation. Further, the integrated control ECU 12 executes the alternative operation 1 while at the same time continuing a normal operation, to thereby take over the operation of the anomaly detection ECU 13.

When the elapsed period of time falls within the time region T3, the anomaly detection ECU 13 stops. In order to stop the vehicle, the recognition/determination ECU 11 executes the degraded operation 5, and the integrated control ECU 12 executes the degraded operation 4.

As shown in FIG. 12B, in a case where an unrecoverable anomaly has occurred in the recognition/determination ECU 11, when the elapsed period of time falls within the time region T1, the recognition/determination ECU 11 stops, the integrated control ECU 12 executes the degraded operation 2, and the anomaly detection ECU 13 executes the alternative operation 1 while at the same time continuing a normal operation, to thereby take over the operation of the recognition/determination ECU 11. When the elapsed period of time falls within the time region T2, a similar operation is executed. When the elapsed period of time falls within the time region T3, the integrated control ECU 12 executes the degraded operation 4.

In this manner, an alternative operation is newly defined as an operation to be executed by each of the recognition/determination ECU 11, the integrated control ECU 12, and the anomaly detection ECU 13, and thus even when an anomaly has occurred in any of those ECUs, a normal ECU can take over the function of an ECU in which an anomaly has occurred, with the result that it is possible to maintain the functionality.

Next, referring to FIG. 13A to FIG. 13F, a description is given of an example of an operation table for determining details of an operation to be executed by each of the surrounding environment acquisition devices 20 to 22, the recognition/determination ECU 11, the integrated control ECU 12, and the anomaly detection ECU 13 at the time of occurrence of an anomaly.

FIG. 13A is a table for showing an operation table for determining the details of an operation to be executed by each of the plurality of surrounding environment acquisition devices 20 to 22, the recognition/determination ECU 11, the integrated control ECU 12, and the anomaly detection ECU 13 in the second embodiment of the present invention. FIG. 13B is a table for showing specifics of an ID of FIG. 13A. FIG. 13C is a table for showing an ID of an anomaly type of FIG. 13B. FIG. 13D is a table for showing an ID of a time region of FIG. 13B. FIG. 13E is a table for showing an ID of a mode/speed of FIG. 13B. FIG. 13F is a table for showing an ID of a surrounding environment of FIG. 13B.

As shown in FIG. 13A, an operation to be executed by each of the surrounding environment acquisition devices 20 to 22, the recognition/determination ECU 11, the integrated control ECU 12, and the anomaly detection ECU 13 is defined for each ID. In FIG. 13B, FIG. 13D, FIG. 13E, and FIG. 13F, the same details as those of FIG. 10B, FIG. 10D, FIG. 10E, and FIG. 10F are defined. In FIG. 13C, the anomaly detection ECU 13 is added to the anomaly type of FIG. 10C.

Regarding the operation of the anomaly detection ECU 13, similarly to the description of the first embodiment, the degraded operation is achieved by the processing of the flow charts of FIG. 5 to FIG. 7.

In this manner, the anomaly detection ECU 13 is configured to take over an operation of an anomaly component when the anomaly component includes the recognition/determination ECU 11 or the integrated control ECU. Therefore, even when the recognition/determination ECU 11 or the integrated control ECU 12 has completely broken down, it is possible to implement the degraded operation.

Further, the recognition/determination ECU 11 or the integrated control ECU 12 is configured to take over the operation of the anomaly detection ECU when an anomaly has occurred in the anomaly detection ECU 13. Therefore, even when the anomaly detection ECU 13 has completely broken down, it is possible to implement the degraded operation.

As described above, the vehicle control device according to the second embodiment is configured to cause a normal electronic device to take over the operation of an electronic device in which an anomaly has occurred in addition to the configuration of the first embodiment. With this configuration, it is possible to implement the degraded operation even when an unrecoverable anomaly (namely, fault) has occurred in one of electronic devices constructing the vehicle control device.

Third Embodiment

In a third embodiment of the present invention, a description is given of the vehicle control device 10 configured to notify the driver of various kinds of information via a display device 70 in addition of each of the configurations of the first and second embodiments. In the third embodiment, a description of points similar to those of the first and second embodiments is omitted, and a difference from the first and second embodiments is mainly described.

FIG. 14 is a configuration diagram for illustrating the vehicle control device 10 according to the third embodiment of the present invention. In FIG. 14, the configurations of the vehicle control device 10, the surrounding environment acquisition devices 20 to 22, the powertrain system ECU 30, the brake ECU 40, the steering ECU 50, and the networks 60 and 61 are similar to those of FIG. 1. In FIG. 14, the display device 70 to be connected to the anomaly detection ECU 13 is further added to the configuration of FIG. 1 as an interface. The anomaly detection ECU 13 may not be connected to the display device 70 in the illustrated manner, but may be connected to the display device 70 via the networks 60 and 61.

Next, a description is given of an example of a message to be displayed on the display device 70 by the anomaly detection ECU 13 with reference to FIG. 15. FIG. 15 is a table for showing details of a message to be displayed by the display device 70 in the third embodiment of the present invention.

As in the example shown in FIG. 9A, when an anomaly has occurred in the surrounding environment acquisition device 20 (camera) and the elapsed period of time falls within the time region T1, a notification indicating that an anomaly has occurred in the camera is issued ("state notification"). Further, a notification ("operation notification") indicating that the camera is being reactivated, a notification ("operation advance notification") indicating that the operation is to transition to a degraded operation, and a notification ("action advance notification") requesting the driver to switch to manual driving as a next action are issued.

When the elapsed period of time falls within the time region T2, a notification ("action notification") requesting switching to manual driving is issued, and when such switching is not performed, a notification ("operation advance notification") indicating that the vehicle is to stop as a next operation is issued.

When the elapsed period of time falls within the time region T3, a notification ("state notification") indicating an anomaly state, a notification ("operation notification") indicating that the vehicle is stopping, and a notification ("action notification") requesting switching to manual driving are issued.

In this manner, the anomaly detection ECU 13 issues an operation notification for notifying of details of specific control being executed. Further, the anomaly detection ECU 13 issues, as an action notification, an action notification presenting an action to be performed by the driver based on the details of specific control being executed.

When the anomaly remains, the anomaly detection ECU 13 issues an operation advance notification notifying the driver of the vehicle that specific control being executed is to be switched to next specific control. Further, when the anomaly remains, the anomaly detection ECU 13 issues an action advance notification presenting an action to be performed by the driver before switching from specific control being executed to next specific control.

Information to be displayed by the display device 70 is not limited to the details shown in FIG. 15, and other required information may be displayed.

In this manner, the anomaly detection ECU 13 notifies the driver of the state of the system via the display device 70, and displays a notification prompting an appropriate operation. Thus, even when an anomaly has occurred, it is possible to maintain the vehicle in an appropriate state. That is, it is possible to maintain the operation of the vehicle by prompting overriding by the driver, and notify the driver that the vehicle is required to be repaired by an automobile dealer, for example.

As described above, the vehicle control device according to the third embodiment is configured to, when an anomaly is detected, notify the driver of various kinds of information in addition to each of the configurations of the first and second embodiments. With this configuration, even when an anomaly has occurred, it is possible to maintain the vehicle in an appropriate state.

Fourth Embodiment

In a fourth embodiment of the present invention, a description is given of the vehicle control device 10 further including a flash ROM 80 configured to store anomaly history information in addition to each of the configurations of the first to third embodiments. In the fourth embodiment, points similar to those of the first to third embodiments are omitted, and a difference from the first to third embodiments is mainly described.

Figure 16:
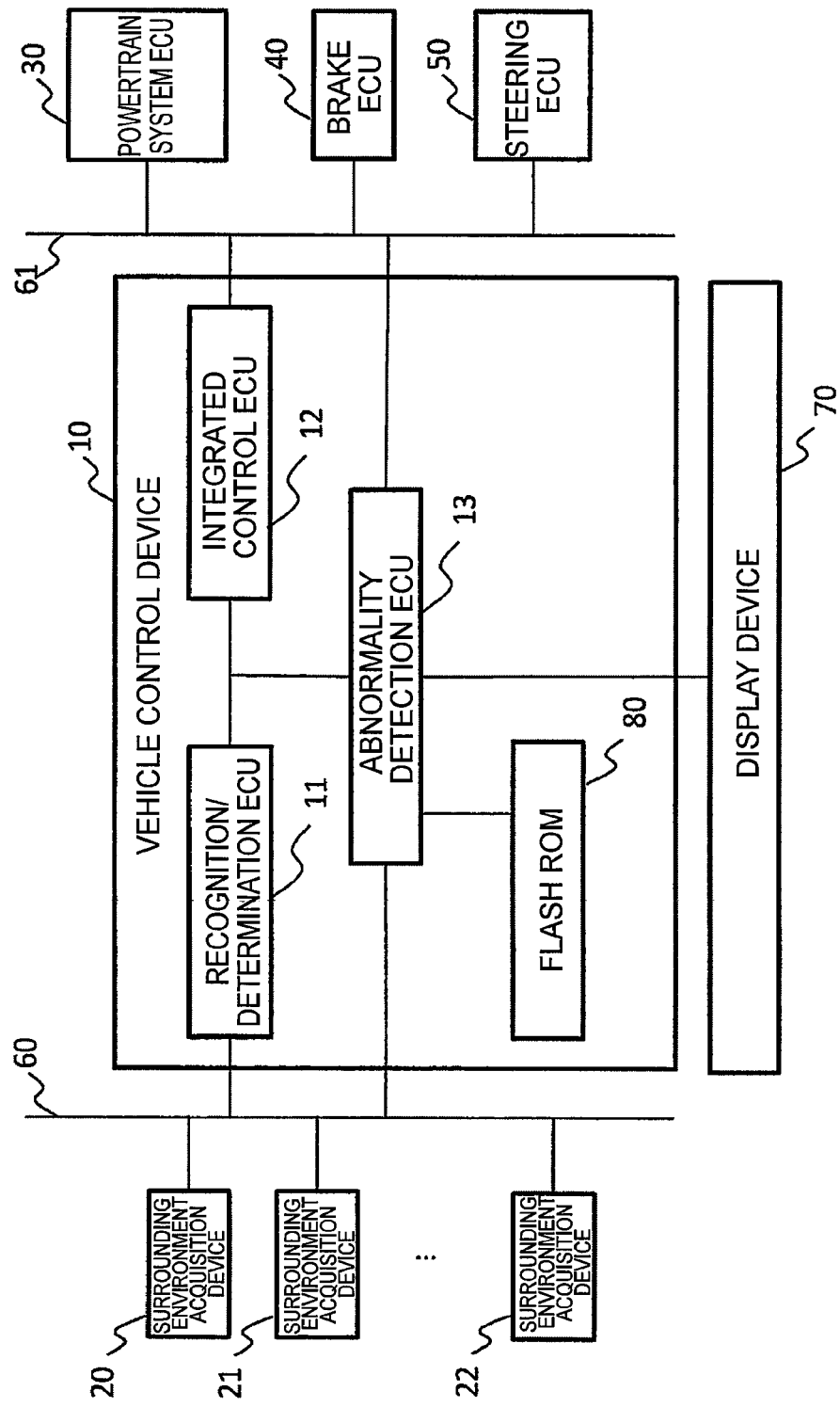
FIG. 16 is a configuration diagram for illustrating a vehicle control device according to a fourth embodiment of the present invention.

FIG. 16 is a configuration diagram for illustrating the vehicle control device 10 according to the fourth embodiment of the present invention. In FIG. 16, the configurations of the recognition/determination ECU 11, the integrated control ECU 12, the anomaly detection ECU 13, the surrounding environment acquisition devices 20 to 22, the powertrain system ECU 30, the brake ECU 40, the steering ECU 50, the networks 60 and 61, and the display device 70 are similar to those of FIG. 14.

The vehicle control device 10 illustrated in FIG. 16 further includes the flash ROM 80 (non-volatile memory) to be connected to the anomaly detection ECU 13 in addition to the configuration of FIG. 14. When an anomaly has occurred in the system, the anomaly detection ECU 13 stores, into the flash ROM 80, information on the anomaly, namely, information indicating what kind of anomaly has occurred, as anomaly history information. Further, the anomaly detection ECU 13 performs early diagnosis described later.

Figure 17:
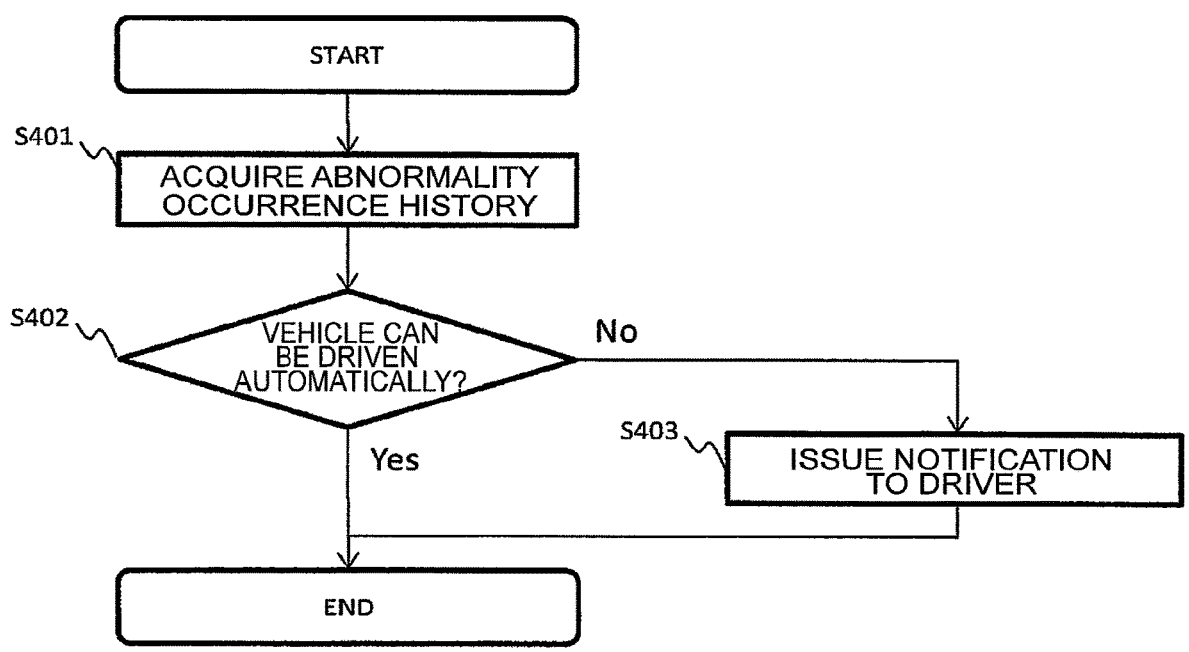
FIG. 17 is a flow chart for illustrating early diagnosis to be executed by an anomaly detection ECU in the fourth embodiment of the present invention.

Next, a description is given of early diagnosis to be performed by the anomaly detection ECU 13 with reference to FIG. 17. FIG. 17 is a flow chart for illustrating early diagnosis to be executed by the anomaly detection ECU 13 in the fourth embodiment of the present invention.

At the time of early diagnosis, the anomaly detection ECU 13 acquires the anomaly history information from the flash ROM 80 (Step S401), and determines whether or not the vehicle can be driven automatically (Step S402). When the vehicle cannot be driven automatically, the anomaly detection ECU 13 notifies the driver that the vehicle cannot be driven automatically.

In this manner, the anomaly detection ECU 13 notifies the driver that the vehicle cannot be driven automatically when determining that the vehicle cannot be driven automatically based on the anomaly history information stored in the flash ROM 80.

That is, through recording of anomaly history information in a case where an anomaly has occurred, when the anomaly that has occurred is due to a failure and cannot be recovered, it is possible to notify the driver that the vehicle cannot be driven automatically at the time of the next operation of the anomaly detection ECU 13.

Further, even when the anomaly that has occurred is a temporary trouble, for example, the performance limit of the anomaly component, it is possible to warn the driver by notifying of the driver of the information. Further, the anomaly history information stored in the flash ROM 80 can also be used as information to be provided to a repairer who repairs the vehicle.

As described above, the vehicle control device according to the fourth embodiment is configured to notify the driver that the vehicle cannot be driven automatically when determining that the vehicle cannot be driven automatically based on the anomaly history information stored in the non-volatile memory, in addition to each of the configurations of the first to third embodiments. With this configuration, it is possible to notify the driver that the vehicle cannot be driven automatically at the time of next activation when a failure has occurred.

REFERENCE SIGNS LIST 10 vehicle control device, 11 recognition/determination ECU, 12 integrated control ECU, 13 anomaly detection ECU, 20 to 22 surrounding environment acquisition device, 30 powertrain system ECU, 40 brake ECU, 50 steering ECU, 60, 61 network, 70 display device, 80 flash ROM

The invention claimed is:

1. A vehicle control device, comprising:
recognition/determination circuitry configured to generate a path on which a vehicle is to travel based on information of a surrounding environment of the vehicle, which is obtained from a plurality of surrounding environment sensors each configured to acquire the information;
integrated control circuitry configured to control the vehicle based on the path generated by the recognition/determination circuitry; and
anomaly detection circuitry configured to determine details of a specific control that defines an operation to be executed by each of the plurality of surrounding environment sensors, the recognition/determination circuitry, and the integrated control circuitry when an anomaly occurs due to a fault of any one of the plurality of surrounding environment sensors, the recognition/determination circuitry, and the integrated control circuitry,
wherein the anomaly detection circuitry is configured to, when the anomaly is detected in each of the plurality of surrounding environment sensors or the recognition/determination circuitry when the vehicle is traveling on the path generated by the recognition/determination circuitry:
determine a first time period and switch to a first specific control, the first time period including a period of time from the occurrence of the anomaly until a change in a behavior of the vehicle due to the anomaly occurs, and the first specific control is a first operation of causing an anomaly component to recover to the normal state, while maintaining an autonomous driving mode,
switch from the first specific control to a second specific control when a period of time has elapsed since the detection of the anomaly reaches the first time period without the first specific control being realized, and the second specific control is a second operation of causing an anomaly component to recover to the normal state,
switch from the second specific control to a third specific control which stops the vehicle, when a period of time has elapsed since the detection of the anomaly reaches a second time period, the second time period being set to be longer than the first time period and the second time period including a period of time obtained by subtracting a period of time required for stopping the vehicle from a period of time from the occurrence of the anomaly until a time point at which a hazardous event is predicted to occur, and when the anomaly is detected in the integrated control circuitry when the vehicle is traveling on the path generated by the recognition/determination circuitry:
immediately switch to the third specific control without execution of any control as the first specific control and the second specific control.

2. The vehicle control device according to claim 1, wherein the anomaly detection circuitry is configured to, when the anomaly is detected, determine the first time period based on at least one of an anomaly type of the occurrence of the anomaly, a traveling state of the vehicle at the time of detection of the anomaly, or a surrounding environment at the time of detection of the anomaly.

3. The vehicle control device according to claim 1, wherein the anomaly detection circuitry is configured to, when the anomaly is detected, determine the details of the specific control based on an anomaly type of the detected anomaly, and a traveling state of the vehicle at a time of detection of the anomaly or a surrounding environment at the time of detection of the anomaly.

4. The vehicle control device according to claim 3, wherein the anomaly detection circuitry is configured to determine the details of the specific control by using an operation table in which the details of the specific control and at least one of the anomaly type, a mode/speed of the vehicle as the traveling state, or the surrounding environment are associated with each other.

5. The vehicle control device according to claim 1, wherein the anomaly detection circuitry is configured to stop the specific control when overriding by a driver of the vehicle is detected.

6. The vehicle control device according to claim 1, wherein the anomaly detection circuitry is configured to take over an operation of an anomaly component when the anomaly component in which the anomaly occurs is the recognition/determination circuitry or the integrated control circuitry.

7. The vehicle control device according to claim 1, wherein the recognition/determination circuitry or the integrated control circuitry is configured to take over an operation of the anomaly detection circuitry when the anomaly occurs in the anomaly detection circuitry.

8. The vehicle control device according to claim 1, wherein the anomaly detection circuitry is configured to notify a driver of the vehicle of the details of the specific control being executed.

9. The vehicle control device according to claim 1, wherein the anomaly detection circuitry is configured to present an action to be performed by a driver of the vehicle, based on the details of the specific control being executed.

10. The vehicle control device according to claim 1, wherein the anomaly detection circuitry is configured to, when the anomaly remains, notify a driver of the vehicle that the specific control being executed is to be switched to a next specific control.

11. The vehicle control device according to claim 1, wherein the anomaly detection circuitry is configured to, when the anomaly remains, present an action to be performed by a driver of the vehicle before the specific control is switched to a next specific control.

12. The vehicle control device according to claim 1, further comprising: a non-volatile memory configured to store, when the anomaly occurs, information of the occurrence of the anomaly as anomaly history information, wherein the anomaly detection circuitry is configured to notify a driver of the vehicle that the vehicle is unable to be driven automatically when determining that the vehicle is unable to be driven automatically based on the anomaly history information stored in the non-volatile memory.

13. The vehicle control device according to claim 1, wherein the anomaly detection circuitry is configured to, when the anomaly is detected, determine the first time period based on the surrounding environment at the time of detection of the anomaly.

14. A vehicle control device, comprising:
recognition/determination circuitry configured to generate a path on which a vehicle is to travel based on information of a surrounding environment of the vehicle, which is obtained from a plurality of surrounding environment sensors each configured to acquire the information:

integrated control circuitry configured to control the vehicle based on the path generated by the recognition/determination circuitry: and anomaly detection circuitry configured to determine details of a specific control that defines an operation to be executed by each of the plurality of surrounding environment sensors, the recognition/determination circuitry, and the integrated control circuitry when an anomaly occurs due to a fault of any one of the plurality of surrounding environment sensors, the recognition/determination circuitry, and the integrated control circuitry, wherein the anomaly detection circuitry is configured to, when the anomaly is detected when the vehicle is traveling on the path generated by the recognition/determination circuitry:

determine a first time period and switch to a first specific control, the first time period including a period of time from the occurrence of the anomaly until a change in a behavior of the vehicle due to the anomaly occurs, and the first specific control is a first operation of causing an anomaly component to recover to the normal state, switch from the first specific control to a second specific control when a period of time has elapsed since the detection of the anomaly reaches the first time period without the first specific control being realized, and the second specific control is a second operation of causing an anomaly component to recover to the normal state, switch from the second specific control to a third specific control which stops the vehicle, when a period of time has elapsed since the detection of the anomaly reaches a second time period, the second time period being set to be longer than the first time period and the second time period including a period of time obtained by subtracting a period of time required for stopping the vehicle from a period of time from the occurrence of the anomaly until a time point at which a hazardous event is predicted to occur, when the anomaly is detected in the integrated control circuitry when the vehicle is traveling on the path generated by the recognition/determination circuitry:

immediately switch to the third specific control without execution of any control as the first specific control and the second specific control, wherein the anomaly detection circuitry is configured to stop the specific control when an anomaly component is returned to a normal state.

15. A vehicle control device, comprising:

recognition/determination circuitry configured to generate a path on which a vehicle is to travel based on information on a surrounding environment of the vehicle, which is obtained from a plurality of surrounding environment sensors each configured to acquire the information;

integrated control circuitry configured to control the vehicle based on the path generated by the recognition/determination circuitry; and anomaly detection circuitry configured to determine details of a specific control that defines an operation to be executed by each of the plurality of surrounding environment sensors, the recognition/determination circuitry, and the integrated control circuitry when an anomaly occurs due to a fault of any one of the plurality of surrounding environment sensors, the recognition/determination circuitry, and the integrated control circuitry, wherein the anomaly detection circuitry is configured to, when the anomaly is detected in each of the plurality of surrounding environment sensors or the recognition/determination circuitry when the vehicle is traveling on the path generated by the recognition/determination circuitry:

switch to a first specific control that is a first operation of causing an anomaly component to recover to the normal state, while maintaining an autonomous driving mode, switch from the first specific control to a second specific control that is a second operation of causing an anomaly component to recover to the normal state, when a period of time has elapsed since the detection of the anomaly reaches a first time period without the first specific control being realized, the first time period including a period of time from an occurrence of the anomaly until a change in a behavior of the vehicle due to the anomaly occurs, and switch from the second specific control to a third specific control which stops the vehicle, when a period of time has elapsed since the detection of the anomaly reaches a second time period, the second time period being set to be longer than the first time period and the second time period including a period of time obtained by subtracting a period of time required for stopping the vehicle from a period of time from the occurrence of the anomaly until a time point at which a hazardous event is predicted to occur, and when the anomaly is detected in the integrated control circuitry when the vehicle is traveling on the path generated by the recognition/determination circuitry:

immediately switch to the third specific control without execution of any control as the first specific control and the second specific control.

16. The vehicle control device according to claim 15, wherein:

the anomaly detection circuitry is configured to determine the details of the specific control so as to execute an operation of stopping the vehicle when the elapsed period of time reaches the second time period but an anomaly component is not in a normal state.

17. The vehicle control device according to claim 15, wherein the anomaly detection circuitry is configured to, when the anomaly is detected, determine the first time period based on at least one of an anomaly type of the occurrence of the anomaly, a traveling state of the vehicle at the time of detection of the anomaly, or a surrounding environment at the time of detection of the anomaly.

* * * * *